US012239945B2

(12) United States Patent
Borjanin et al.

(10) Patent No.: US 12,239,945 B2
(45) Date of Patent: Mar. 4, 2025

(54) KITCHEN APPLIANCE APPARATUS

(71) Applicant: Airtender Works B.V., Zoetermeer (NL)

(72) Inventors: Dalibor Borjanin, Nieuwerkerk aan den IJssel (NL); Robert Franciscus Van Der Hulst, Leiden (NL); Rui Medeiros Santos, Rotterdam (NL)

(73) Assignee: Airtender Works B.V., Zoetermeer (NL)

( * ) Notice: Subject to any disclaimer, the term of this patent is extended or adjusted under 35 U.S.C. 154(b) by 2 days.

(21) Appl. No.: 17/695,991

(22) PCT Filed: Sep. 17, 2020

(86) PCT No.: PCT/NL2020/050576

§ 371 (c)(1),
(2) Date: Mar. 16, 2022

(87) PCT Pub. No.: WO2021/054828

PCT Pub. Date: Mar. 25, 2021

(65) Prior Publication Data

US 2024/0042400 A1 Feb. 8, 2024

(30) Foreign Application Priority Data

Sep. 18, 2019 (NL) ...................................... 2023846

(51) Int. Cl.
*F04B 49/22* (2006.01)
*B01F 23/235* (2022.01)
(Continued)

(52) U.S. Cl.
CPC ............ *B01F 33/40* (2022.01); *B01F 23/235* (2022.01); *B01F 23/2361* (2022.01);
(Continued)

(58) Field of Classification Search
CPC .... B01F 33/40; B01F 23/235; B01F 23/2361; B01F 2101/07; B01F 2101/17;
(Continued)

(56) References Cited

U.S. PATENT DOCUMENTS 6,832,634 B1 12/2004 Chantalat
2005/0098225 A1* 5/2005 Chantalat .............. B65B 31/047
141/64
(Continued)

FOREIGN PATENT DOCUMENTS

CN 101541690 A 9/2009
CN 102227230 A 10/2011
(Continued)

OTHER PUBLICATIONS

JP03092060 translation (Year: 2024).*
International Search Report and Written Opinion—PCT/NL2020/050576—mailing date Nov. 13, 2020.

*Primary Examiner* — David N Brandt
(74) *Attorney, Agent, or Firm* — Banner & Witcoff, Ltd.

(57) ABSTRACT

There is provided a kitchen appliance apparatus for using air in the kitchen, comprising a housing, wherein in the housing a pump system is provided which pump system comprises, a primary port (106), a secondary port (107), a single direction air pump (101) having an inlet (102) and an outlet (103); wherein the pump system is operational in a first pump mode in which air can be sucked in via the primary port; the pump system is operational in a second pump mode in which air can be blown out via the primary port; and is operational in a third pump mode in which the pump system is alternatingly sucking in and blowing air via the primary port.

20 Claims, 17 Drawing Sheets

Figure 1:
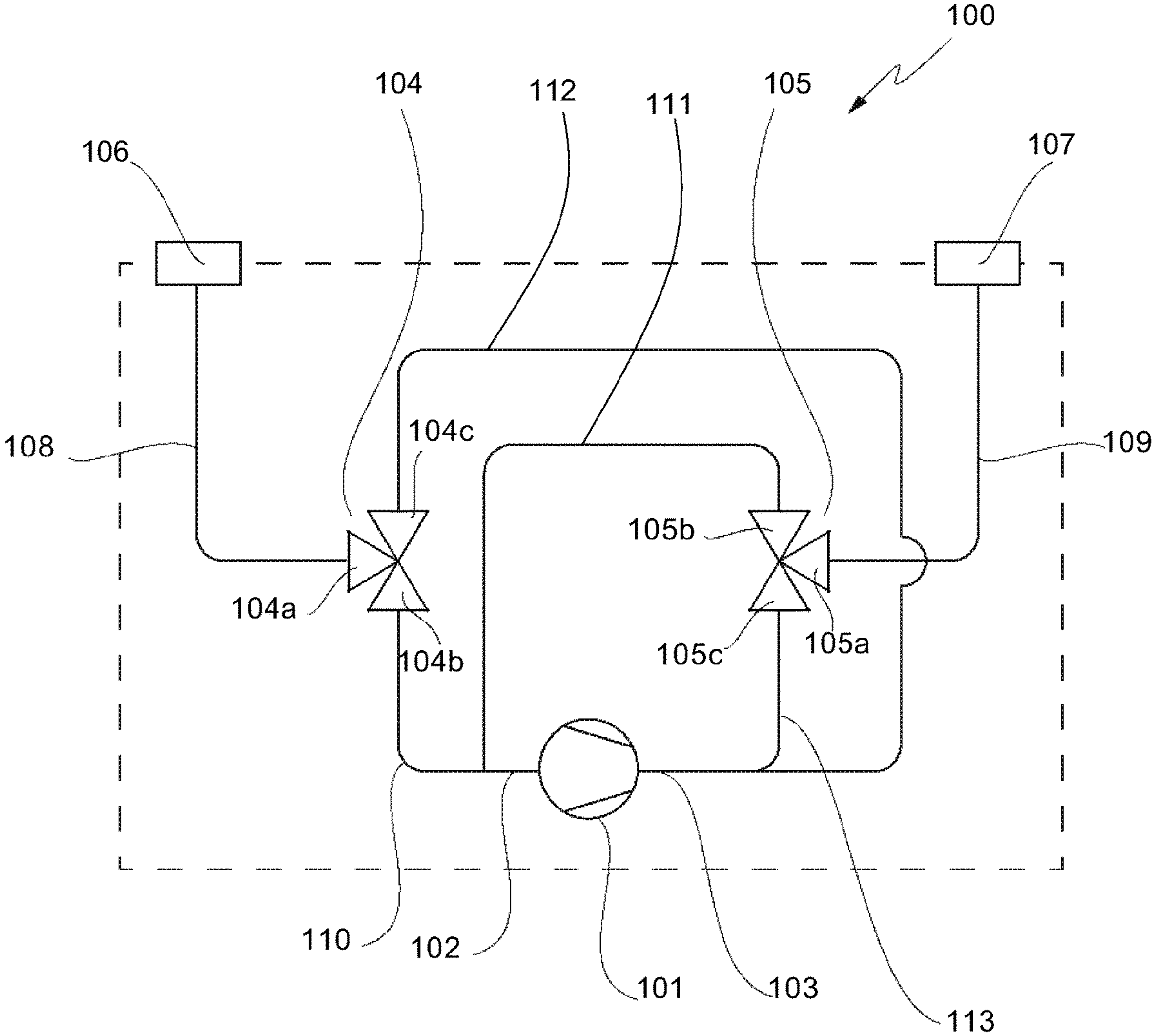

(51) Int. Cl.

| | |
|---|---|
| ***B01F 23/2361*** | (2022.01) |
| ***B01F 33/40*** | (2022.01) |
| ***F04B 7/00*** | (2006.01) |
| ***F04B 39/08*** | (2006.01) |
| ***F04B 39/10*** | (2006.01) |
| ***F04B 49/06*** | (2006.01) |
| ***F04B 53/10*** | (2006.01) |
| *B01F 101/07* | (2022.01) |
| *B01F 101/17* | (2022.01) |

(52) U.S. Cl.
CPC .......... *F04B 49/22* (2013.01); *B01F 2101/07* (2022.01); *B01F 2101/17* (2022.01); *F04B 7/0076* (2013.01); *F04B 39/08* (2013.01); *F04B 39/10* (2013.01); *F04B 49/065* (2013.01); *F04B 53/10* (2013.01)

(58) Field of Classification Search
CPC ........ F04B 49/22; F04B 7/0076; F04B 39/08; F04B 39/10; F04B 49/065; F04B 53/10
See application file for complete search history.

(56) References Cited

U.S. PATENT DOCUMENTS

| | | | | |
|---|---|---|---|---|
| 2009/0005746 | A1 | 1/2009 | Nielsen et al. | |
| 2010/0051228 | A1* | 3/2010 | Han | F28F 9/0209 165/41 |
| 2016/0106136 | A1 | 4/2016 | Gordon et al. | |
| 2017/0212093 | A1* | 7/2017 | Virtanen | B01F 25/51 |

FOREIGN PATENT DOCUMENTS

| | | | | |
|---|---|---|---|---|
| CN | 102330691 A | | 1/2012 | |
| CN | 106403097 A | | 2/2017 | |
| JP | 03092600 | * | 4/1991 | F04D 29/50 |
| JP | 2001354206 A | | 12/2001 | |
| JP | 2006320886 A | | 11/2006 | |
| JP | 2008237996 A | | 10/2008 | |
| JP | 2013066818 A | | 4/2013 | |
| KR | 20000012424 A | | 3/2000 | |
| KR | 20090030021 A | | 3/2009 | |
| WO | 2010059251 A1 | | 5/2010 | |
| WO | 2016027003 A1 | | 2/2016 | |
| WO | 2017031212 A1 | | 2/2017 | |

* cited by examiner

KITCHEN APPLIANCE APPARATUS

CROSS-REFERENCE TO RELATED APPLICATIONS

This application is a U.S. National Stage application under 35 U.S.C. § 371 of International Application PCT/NL2020/050576 (published as WO 2021/054828 A1), filed Sep. 17, 2020, which claims the benefit of priority to Application NL 2023846, filed Sep. 18, 2019. Benefit of the filing date of these prior applications is hereby claimed. Each of these prior applications is hereby incorporated by reference in its entirety.

The invention relates to an apparatus for using air in the kitchen.

An apparatus for using air in the kitchen, either a consumer kitchen or a professional kitchen, is known. There is e.g. known an apparatus to automatically aerate wine in a carafe or glass. Also, there is known an apparatus having a chamber for conserving food and an integrated vacuum pump. The vacuum pump vacuums the chamber such that the food contained in the chamber can be longer conserved. The use of air in the kitchen can be helpful for vacuuming a bowl or a tray or a jar or a bag in which food can be stored and/or marinated. Also, air can be used for aerating wine or for making foam of hot milk.

A drawback of all these apparatuses is that they are dedicated for a single function, also they appear to be rather bulky requiring a lot of space in the kitchen. There is a need for a more versatile and compact apparatus for using air in the kitchen.

Thereto, the invention provides for an apparatus according to claim 1.

By providing a kitchen appliance apparatus for using air in the kitchen, comprising a housing, wherein in the housing a pump system is provided which pump system comprises, a primary port; a secondary port; a single direction air pump having an inlet and an outlet; a first three-way valve fluidly connected to the primary port, to the inlet of the pump and to the outlet of the pump, a second three-way valve fluidly connected to the secondary port, to the inlet of the pump and to the outlet of the pump; wherein the primary port is arranged for connection with an accessory outside of the housing, wherein the secondary port is arranged for fluid connection with the environment outside of the housing; wherein the pump system is operational in a first pump mode in which air can be sucked in via the primary port; the pump system is operational in a second pump mode in which air can be blown out via the primary port; and is operational in a third pump mode in which the pump system is alternatingly sucking in and blowing air via the primary port, a stand-alone apparatus can be obtained that can be used for sucking air out of, for example, a coupled accessory and for blowing air into, for example, a coupled accessory, as well as alternatingly sucking air out and blowing air in. In the first pump mode, the pump operates in suction mode. In the second pump mode, the pump operates in blowing mode, and in the third pump mode, the pump operates in alternating mode.

The apparatus can thus be used in the first mode, that can be used for vacuuming, for example, a coupled accessory, such as a jar or a bag or a pot or a tray or any other container for storing food. The apparatus can also be used in a second mode, that can be used for example, for making foam or aerating etc. Further, advantageously, the apparatus can also be used in a third mode in which it can alternatingly suck air out of, for example, a coupled accessory, and blow air into the coupled accessory, e.g. for marinating food enclosed in the accessory. As such, a compact and versatile apparatus can be obtained that allows the easy use of air in the kitchen for various applications. Contrary to the prior art systems, there is now a single stand-alone apparatus that can provide multiple functions with air in the kitchen. By providing a single direction air pump that is fluidly connected with two three-way valves, the pump system in the apparatus can be operated in two directions without the use of an expensive and complex dual-way pump. Thus, a relatively cost effective pump system with a limited number of components is obtained, such that the system can be compact. A compact system can be advantageous as it consumes relatively little space in the kitchen where the kitchen top becomes more crowded with various apparatuses. Also, the compact apparatus is relatively easy to handle.

Advantageously, the apparatus further comprises a control unit that is configured for controlling the operation of the three-way valves depending on the pump mode. By providing the control unit, switching between the different pump modes is possible without a complex mechanical switching system. The control unit may be provided on a printed circuit board arranged inside of the housing of the apparatus, forming part of the pump system.

By providing the pump system with a pressure sensor arranged in a channel connecting the primary port with the first three-way valve, the pressure in the pump system can be monitored. In particular, when the pump system is in the first mode, it can be monitored whether a negative pressure is being built up in an accessory coupled to the primary port and out of which air is being pumped. When a sufficient negative pressure is achieved in the coupled accessory, measured by the pressure sensor in e.g. the primary port channel, the pumping process may be stopped, for example automatically by a control unit. Alternatively, the pressure sensor can monitor the positive pressure built up by the pump in the second mode for blowing air out of the primary port. Also, in the third mode, the pressure sensor can be used to monitor the difference between negative and positive pressure. A negative pressure or an negative pressure or sometimes called vacuum, is considered to be a pressure below the atmospheric pressure. A positive pressure is considered to be a pressure above the atmospheric pressure.

By arranging a protective film in the primary port channel that connects the primary port with the first three-way valve, wherein the protective film is arranged to allow air pass through and liquid not, at least the three-way valve can be protected from moisture ingress. In the event of moisture ingress via the primary port, the moisture, and/or any other dirt, is being accumulated by the film. As such, when bringing the pump system in the second pump mode, the accumulated moisture and/or dirt can be blown out of the primary port channel and be removed from the primary port channel via the primary port. Thus, self-cleaning of the pump system is possible. Of course, additionally and/or alternatively other moisture protection can be possible, as will be elaborated later. Preferably, the protective film is arranged between the primary port and the pressure sensor, as to protect the pressure sensor from moisture and/or dirt ingress as well.

Advantageously, the primary port is arranged for connection to an accessory. The accessory can for example be a food container that is coupled to the primary port, or can be a hose engaged to the primary port, the hose itself may then be arranged at a free end thereof for connection to the accessory. The primary port is preferably arranged in the housing, more preferably in a wall of the housing, as to form an interface between the pump system inside of the housing, and the outside of the housing. The primary port may for example be an opening in the housing through which the hose can be engaged, wherein the hose at one end is arranged for, direct or indirect, connection to the first three way-valve and at its other free end is provided with a coupling element for coupling with an accessory. Alternatively, the primary port can be a coupling element to which an accessory can be directly coupled. Alternatively, the primary port provides for the interface with the pump system and an accessory or a coupling element outside of the pump system. The primary port may then be configured inside of the housing and the connection may be provided by a hose that at one end is connected with the pump system and at another end is provided with a coupling element for connection to an accessory.

Also, the secondary port is preferably arranged in the housing, more preferably in a wall of the housing, to form an interface with the pump system inside of the housing and the environment outside of the housing. The secondary port is in particular arranged to form a fluid connection with the environment outside of the housing, such that air can be blown out via the secondary port when the pump system is in the first mode and air can be sucked in via the secondary port when the pump system is in the second mode, as well as in the alternating mode.

By providing the three-way valves as three-way solenoid valves, relatively compact and easy to control valves are used. Advantageously, the pump system further comprises a printed circuit board to which the three-way valves are connectable. The three-way valves, in particular the three-way solenoid valves, may be directly connectable to the printed circuit board, or may be indirectly connectable to the printed circuit board. In an embodiment, the three-way solenoid valves are indirectly connectable to the printed circuit board, wherein the solenoid valves are mounted on a support and the support is mountable on the printed circuit board. As such, an indirect connection with the printed circuit board can be established allowing a compact arrangement of the valves inside of the housing of the apparatus. Also, by connecting the solenoid valves via a support to the printed circuit board, the system may be relatively easy to assemble.

Advantageously, the valves are mounted to one side of the support and the other side of the support is provided with recesses for forming a channel connection with one of the valves or the pump. When the support then is mounted to the printed circuit board, the recesses are closed by the printed circuit board to form a channel through which the air that is being pumped can flow. Part of the channels of the pump system can thus be partially integrated in the support and upon installation a channel can be formed in which the recesses are closed by the printed circuit board. As such, the support is also used to form a fluid connection between the valves and/or the pump providing for a relatively compact build-up of the pump system. As such, the support is arranged as a manifold for multiple fluid connections.

Advantageously, a sealing member is provided between the support and the printed circuit board to seal off the channels thus formed. One of the recesses in the support may be provided with an arrangement for a pressure sensor, e.g. with a seat in which a pressure membrane can be held. The pressure sensor may thus be arranged in the thus formed channel. In that case, the sealing member leaves the pressure sensor free.

The fluid connections between the valves and/or the pump and/or the primary or secondary port are advantageously provided as flexible hoses arranged inside of the housing. The flexible hoses provide for an easy to assemble and relatively cost-effective fluid connection in the pump system, and can be relatively easy folded inside of the housing. Advantageously, a locking guide is provided through which at least one of the hoses is guided, in particular the hoses downstream of the pump. By providing such a locking guide, assembly of the hoses inside of the housing and connection of the hoses to the support becomes easier. The locking guide can be provided with at least two openings through which a hose can be inserted such that the hose at one end is inserted through such an opening and at another end as well. Both ends of the hose may then extend at one side of the locking guide. The locking guide advantageously is arranged at the side of the support opposite the recesses-side. As such, by mounting the locking guide onto the support and by tightening the locking guide to the support, the hoses are automatically connected to the associated openings in the support, and thus, a tight fit can be obtained. Advantageously, the locking guide is in particular suitable for hoses that are subject to a positive pressure. Hoses that are subject to a negative pressure may form a tight fit due to the negative pressure during use.

In an embodiment, the control unit is provided on the same printed circuit board as the three-way valves are connectable to. As such, an even more compact arrangement can be provided, and the pump system can be operational using a single printed circuit board.

Additionally, the apparatus may be provided with a user interface, that is in operational communication with the control unit. Advantageously, the user interface is directly provided on the printed circuit board, in particular the electronic components of the user interface are directly provided on the printed circuit board, while the components that are configured to be in contact with the user are preferably provided on a wall of the housing. For example, the user interface can comprise touch buttons that are configured for contact with the user, namely the user contacts or presses the area on the wall of the housing that is dedicated to that end. Below such a contact area, typically the buttons are provided that, preferably, may or, alternatively, may not be directly provided on the printed circuit board. Alternatively, the user interface can be a touch screen, display, panel etc. Also, the user interface may be provided on a mobile communications device, in particular onto a smart mobile communications device, such as a smart phone, tablet or computer that is in wireless communication with the control unit. For example, the user contact area of the user interface may be provided at top side of the housing with the printed circuit board positioned immediately beneath it, such that the contact area can be in direct contact with the buttons provided on the printed circuit board.

By supporting the pump resiliently in the housing, vibrations and/or noise initiated by the pump may be obviated or at least limited from being transmitted to the housing. As such, it may be obviated that the apparatus might start moving during operation of the pump, e.g. on a table top or a kitchen top and/or it may be obviated that the housing is vibrating itself. Also, by limiting the transmission of any vibrations from the pump to the housing, the lifetime of the housing may be increased. Advantageously, the pump is also supported independently of other components of the pump system, such as the printed circuit board and/or the valves. By supporting the pump independently and/or resiliently with respect to the other components, the other components, such as the relatively sensitive electronic components can be protected from vibrations, which may increase their lifetime.

For example, to that end, the housing may comprise a base part and an upper part, wherein the pump is resiliently supported to the base part. As such, the upper part of the housing can be independent from the base part, and can remain free of vibrations from the pump.

Advantageously, the pump system is provided with a moisture detection element in a channel upstream of the pump. Moisture in the pump system may adversely affect the functioning of the pump, so an early detection may be advantageous for the functioning of the pump system. Upon detection of moisture in the pump system, the working of the pump may be stopped to allow the moisture to be removed from the pump system, or, a moisture removal element may be in place to prevent moisture from harming the pump. For example, the moisture detection element may comprise an electrical moisture sensor e.g. comprising two electrical contact points that are arranged in a channel upstream of the pump, preferably in a channel between the primary port and the first three-way valve. When there is moisture in the air passing by the electrical contact points of the electrical moisture sensor, the electrical contact points are brought in electrical contact resulting in a voltage drop. Such a voltage drop can be detected and be signaled that moisture is detected. Such a detection signal may then e.g. be transmitted to the control unit that may shut down the pump or may bring the pump into the second mode to blow the moisture out of the channel.

Alternatively and/or additionally, the moisture detection element may comprise a moisture absorbing material arranged in a channel upstream of the pump, preferably in a channel between the primary port and the first three-way valve. The moisture absorbing material may e.g. be a foam in which the moisture can be captured, once the foam is saturated a detection signal may be sent to the control unit to shut down the pump until the moisture absorbing material is replaced. The moisture absorbing material for example can be a material that swells when it comes in contact with moisture and thus may block the channel, thereby the working of the pump may be stopped.

Alternatively and/or additionally, the moisture detection element may comprise and optical sensor detecting fluid droplets in a channel upstream of the pump. The optical sensor may see fluid passing by in the channel upstream of the pump, and may signal detection of any fluid.

Alternatively and/or additionally, the moisture detection element may comprise an internal reservoir that is fluidly connectable to a channel upstream of the pump, preferably connectable to a channel between the primary port and the first three-way valve. The internal reservoir may thus capture any moisture of fluid entering the pump system via the primary port, e.g. until the internal reservoir is filled. Advantageously, the internal reservoir holds any liquid entering the internal reservoir between moisture detection and halting of the pump. Advantageously, additional to the internal reservoir a moisture detection sensor may be present, e.g. in the channel upstream of the internal reservoir and/or in the internal reservoir itself. Then, a detection signal may be sent such that the internal reservoir can be emptied. The internal reservoir preferably is provided in the housing and accessible for the user, such that the user can access it to remove it from the housing and empty it. As such, the internal reservoir may form part of the pump system and of a moisture detection element for obviating moisture to adversely effect the functioning of the pump. The size of the internal reservoir may thus be constrained by the available space inside of the housing, but is preferably at least as large as twice the volume displacement of air and/or liquid in the time between detection and the halting of the first pump mode. Advantageously, the functioning of the pump in the first pump mode is stopped upon detection of moisture by the moisture detection sensor and/or the internal reservoir. Then, the pump may continue working in the second pump mode in an attempt to blow the channel clean of moisture. The pump may continue working in the second pump mode until the user actively stops the working of pump. The pump may then only restart when the internal reservoir has been emptied. The user may then restart the pump, and/or it can be checked by the moisture detection element that no moisture is detected and thus, effectively, the internal reservoir was emptied before restarting the pump.

Alternatively and/or additionally, the moisture detection element may comprise an external container that is fluidly connectable with the primary port. The external container is positioned outside of the housing and is separate from the housing. The external container advantageously has a first opening for connection with the primary port and has a second opening for connection with an accessory. As such, the external container is positioned between the accessory and the primary port to capture any moisture that is being sucked in from the accessory. Advantageously, the external container is provided with a third opening that is in fluid connection with the environment outside and can be closed so a negative pressure can be created in the external container, and the accessory coupled to it, when the pump is in the first mode, or an positive pressure can be created in the external container, and the accessory coupled to it, when the pump is in the second mode. When the third opening is open, the external container is in fluid connection with the environment outside of the external container.

Alternatively and/or additionally, an accessory may be provided wherein the accessory comprises an external container. The accessory advantageously has a first opening for connection with the primary port. The accessory advantageously has a second opening fluidly connecting the first opening to the environment. The accessory advantageously has a third opening fluidly connecting the external container to the environment, which may be opened or closed to provide a fluid connection with the environment or with the second opening respectively. The accessory may be embodied as a fluid injector wherein the external container is integrated to the injector. So, instead of providing a separate external container for receiving fluid, the container is integrated to the injector. By providing an accessory comprising an integrated fluid receiving container, a compact design may be achieved.

Alternatively and/or additionally, a pressure created by the pump may be transferred to an external container by a pressure transferring element. The pressure transferring element can for example be a piston. By transferring the pressure created by the pump by the pressure transferring element, no fluid connection between the pump and the external container is required. As such, fluid transmission between the pump and the external container may be obviated and contamination may be avoided. Advantageously, the accessory as an injector with integrated container, may comprise a piston that is biased towards a first position. When the injector is connected to the primary port of the apparatus, the apparatus may provide sufficient pressure to overcome the biasing force of the piston to move the piston to a second position towards the second opening of the accessory, typically the outlet or injection needle. Typically, in the first position of the piston, the volume of the receiving container is larger than the volume of the receiving container in the second position. In the first position of the piston, the piston is biased towards the first opening of the injector accessory. As such, fluid or liquid can be sucked up with the injector into the container, but can also be pumped out of the container of the injector. As such, liquid can be sucked up from, e.g. a receptacle, into the integrated container of the injector, and/or liquid received in the integrated container of the injector can be ejected out of the injector into food or can be sprayed out of the injector over food.

In another aspect there is provided a system comprising an apparatus and an accessory that is fluidly connectable with the primary port. Advantageously, the accessory is connectable to the primary port via an external container having a first opening fluidly connectable to the primary port of the apparatus, and having a second opening that is fluidly connectable to the accessory, which may be a hose. Liquid or moisture accidentally, or deliberately, present in the air flow blown out or sucked in via the second opening, can be received in the external container. By providing such an external container, it may be avoided or limited that liquid enters into the pump system.

Further, the external container may be provided with a third opening for connection with the environment outside the external container, wherein opening or closing of the third opening provides for creating a negative pressure or a positive pressure in the external container depending on the operational mode of the pump system. As such, via the accessory liquid from the external container can be removed from the container via the second opening of the container and the accessory. Or, liquid can be sucked up via the accessory, which may be a simple hose, to be received in the container. For example, the accessory connectable to the external container can be provided as a fluid injector. The fluid injector may facilitate injection of liquid into food, such as meat, or may facilitate distribution of liquid over food. Also, the fluid injector may allow more easy sucking up of liquid.

Alternatively, the accessory may be provided as a fluid injector to which the container for receiving liquid is integrated. The fluid injector may comprise a piston chamber receiving a piston therein, such that the piston divides the chamber in a first chamber in fluid connection with the first opening of the accessory, and a second chamber in fluid connection with a second opening, namely the outlet or injection needle, of the accessory. The second chamber is then embodied as the container for receiving liquid therein.

Further advantageous embodiments are represented in the subclaims.

Figure 2:
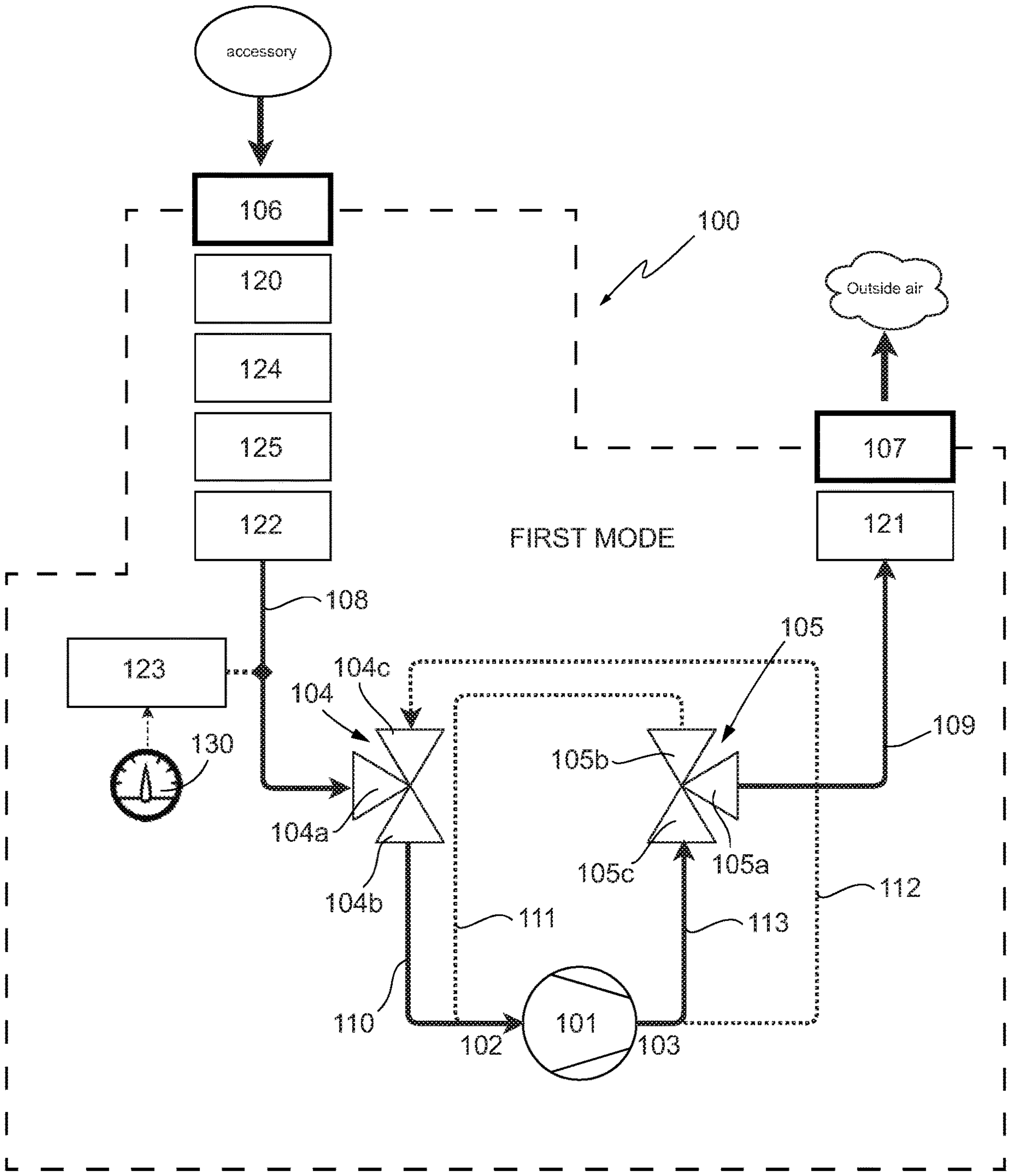
Figure 3:
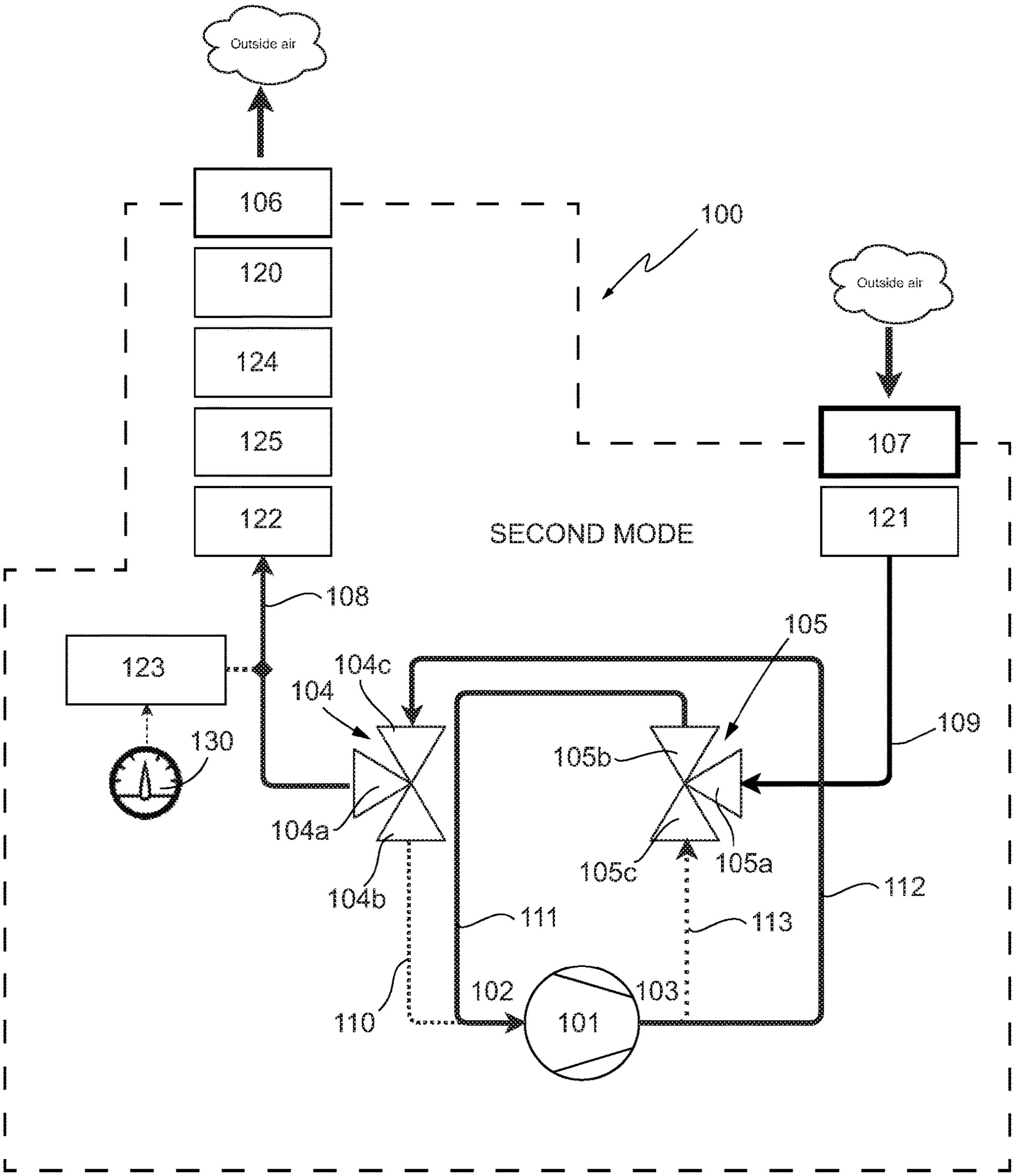
Figure 4:
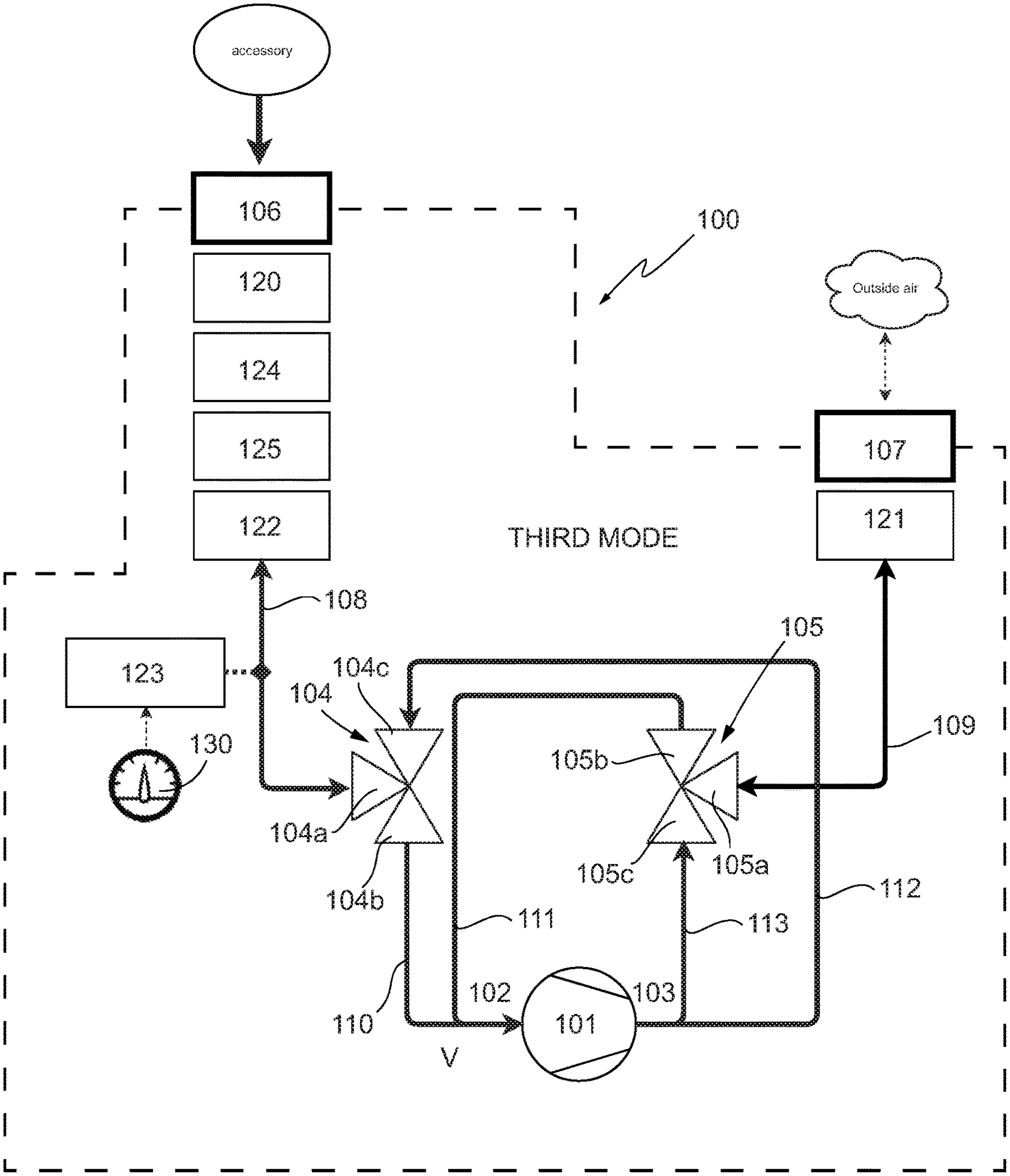
Figure 5:
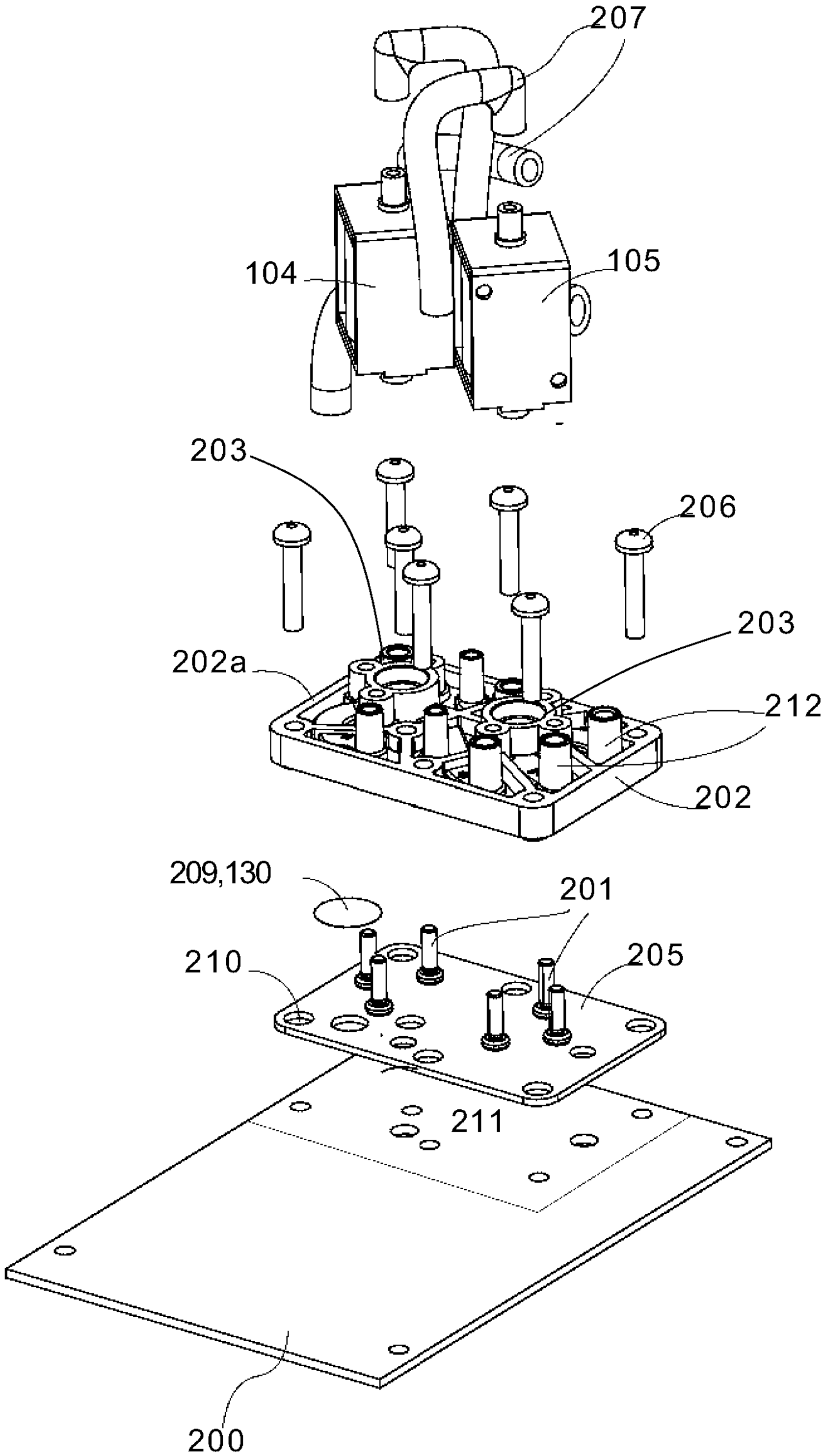
Figure 6:
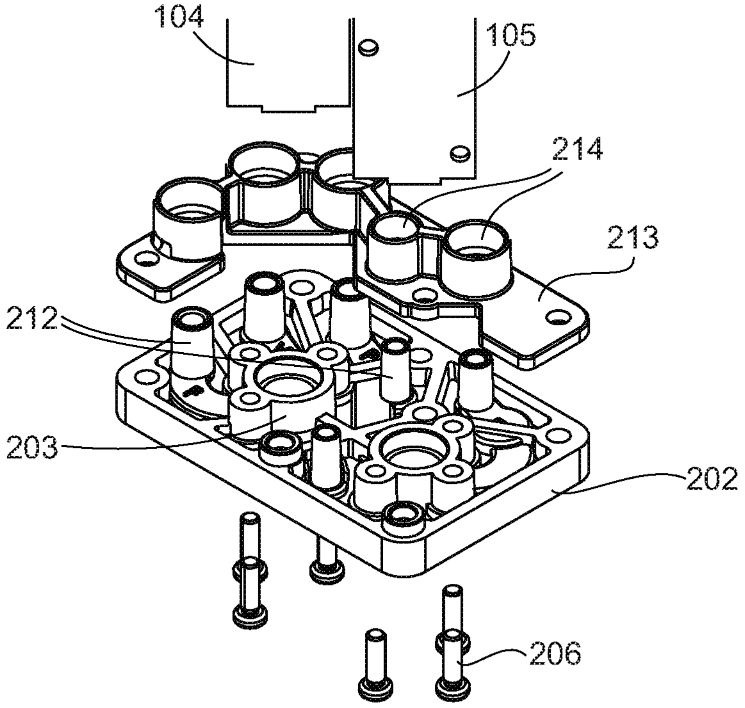
Figure 7:
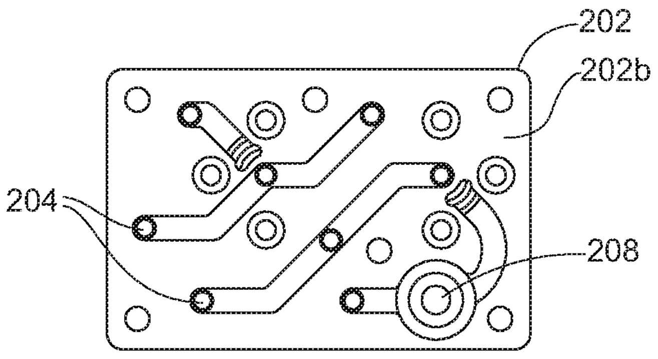
Figure 8:
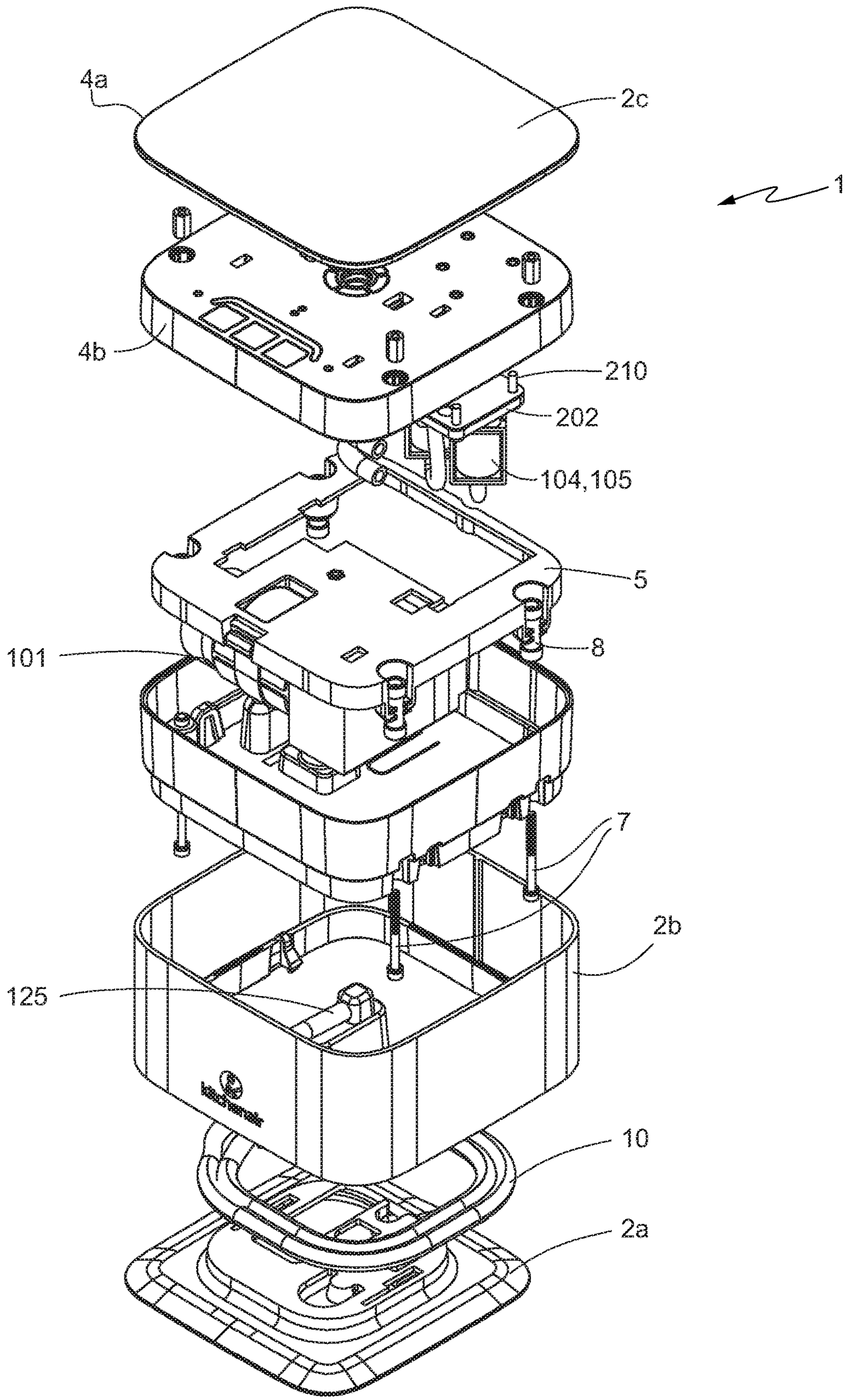
Figure 9:
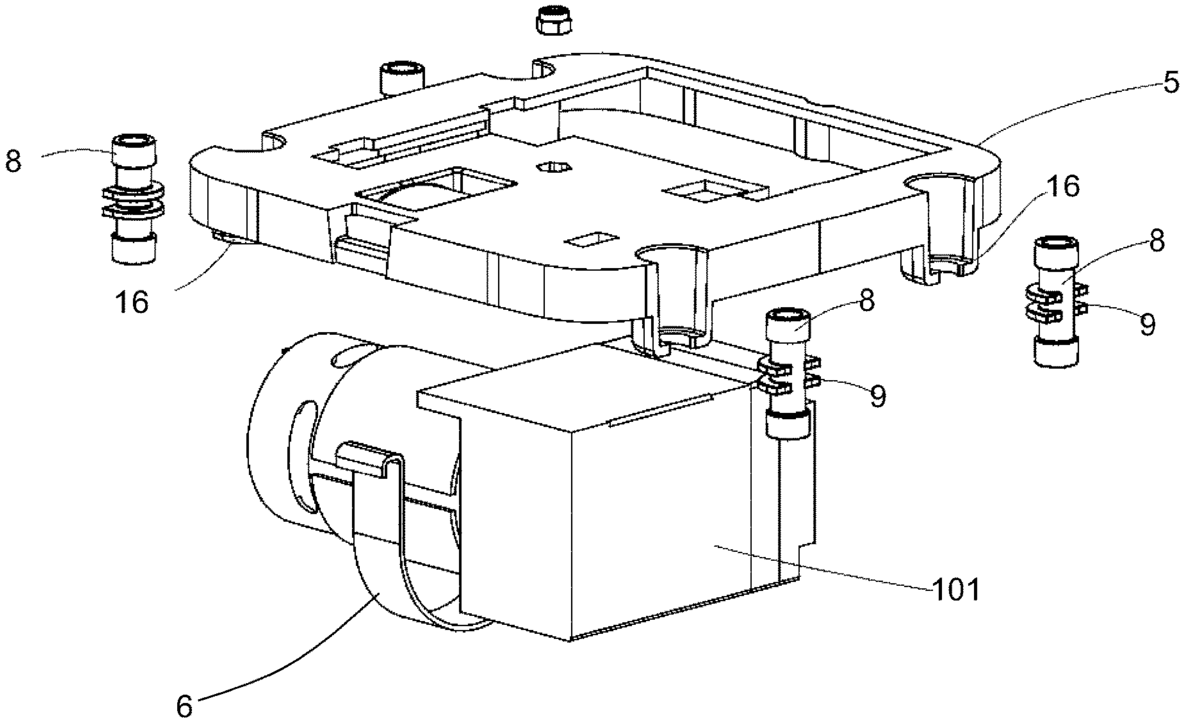
Figure 10:
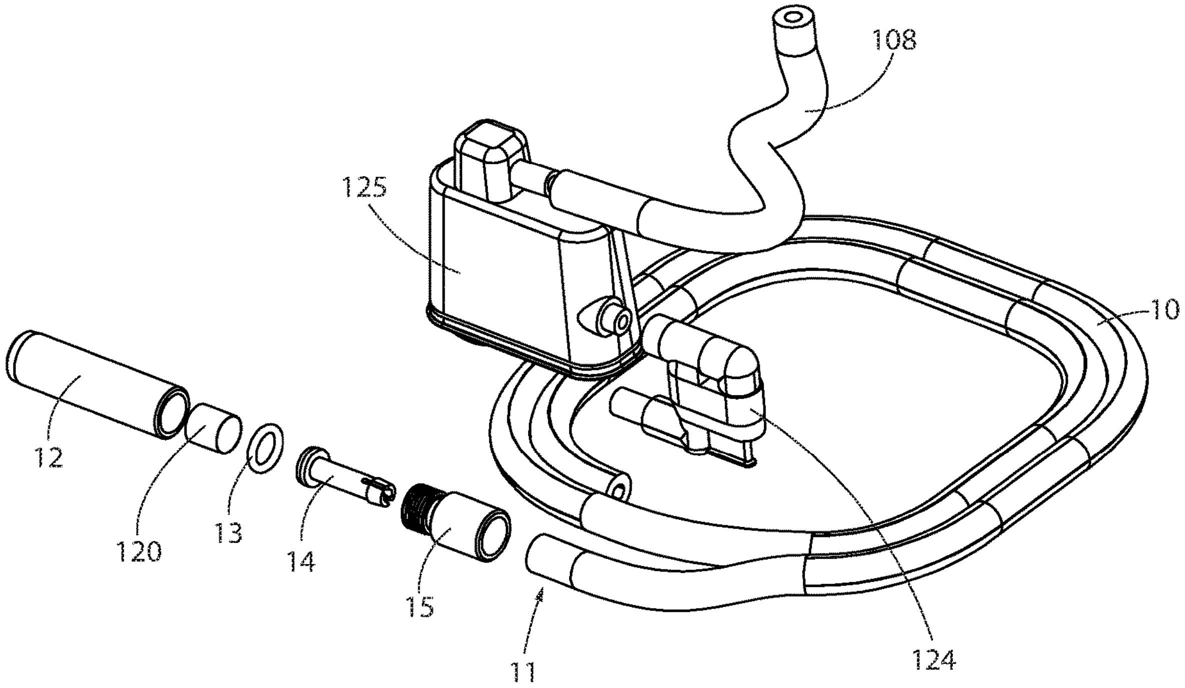
Figure 11:
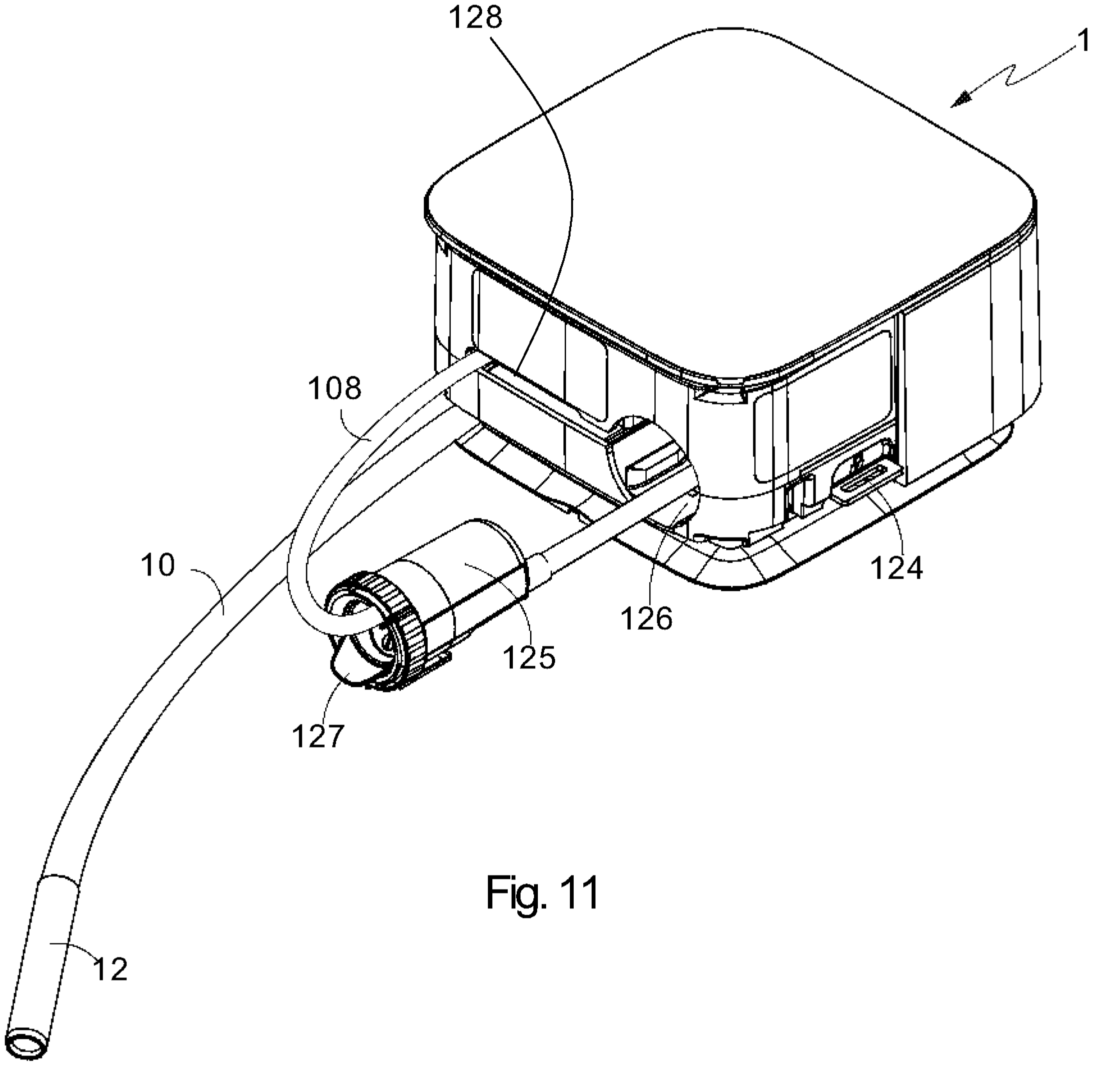
Figures 12A, 12B, 12C:
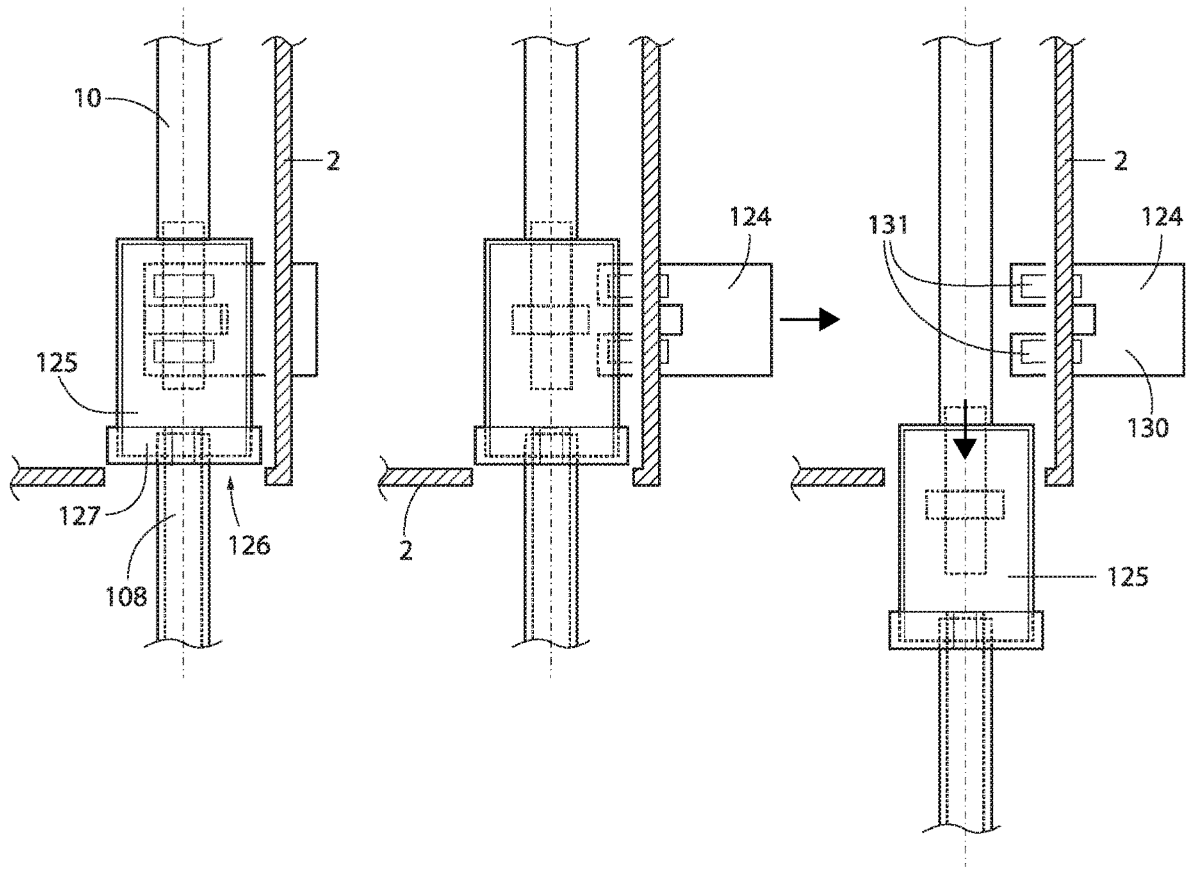
Figure 13:
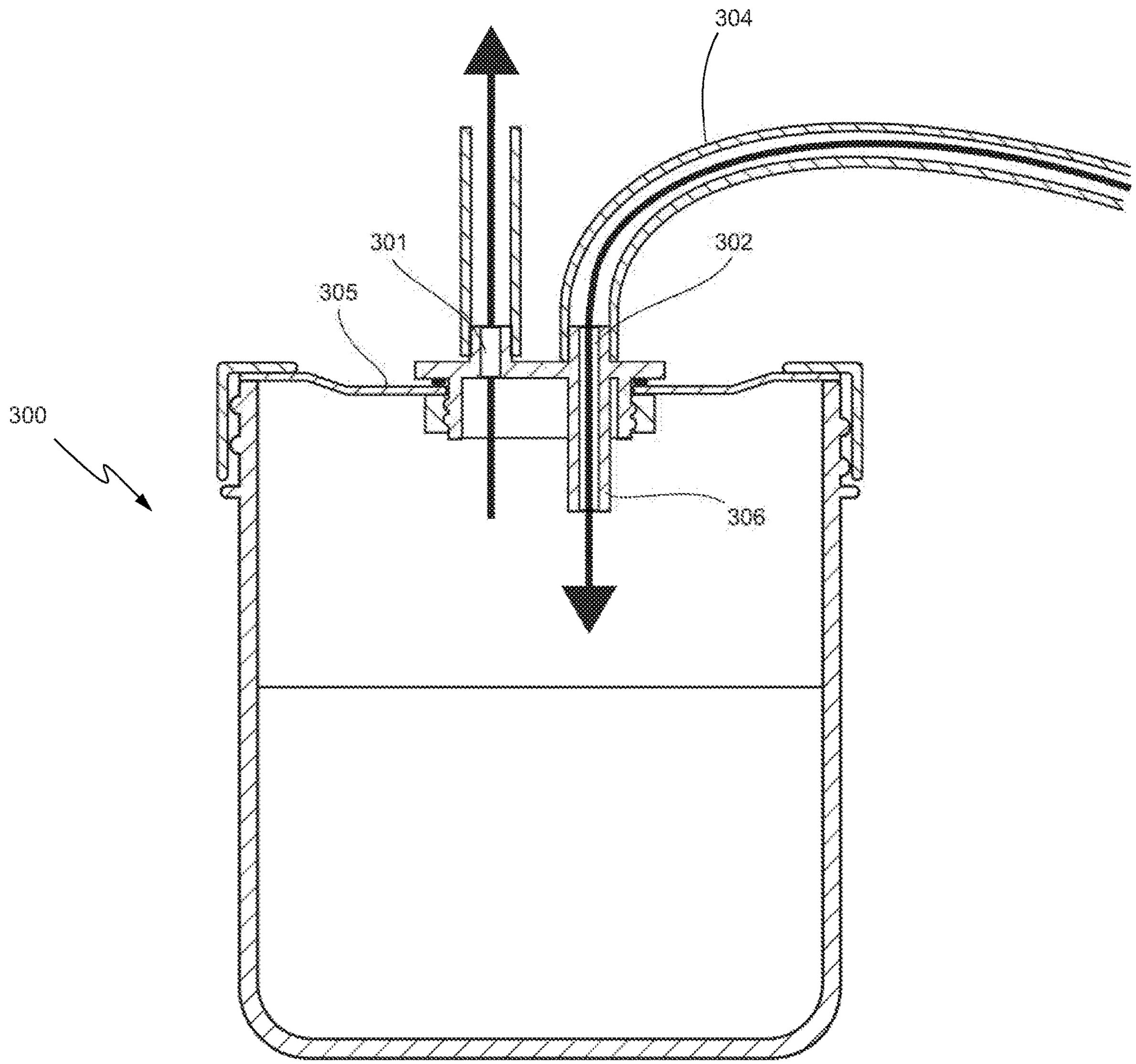
Figure 14A:
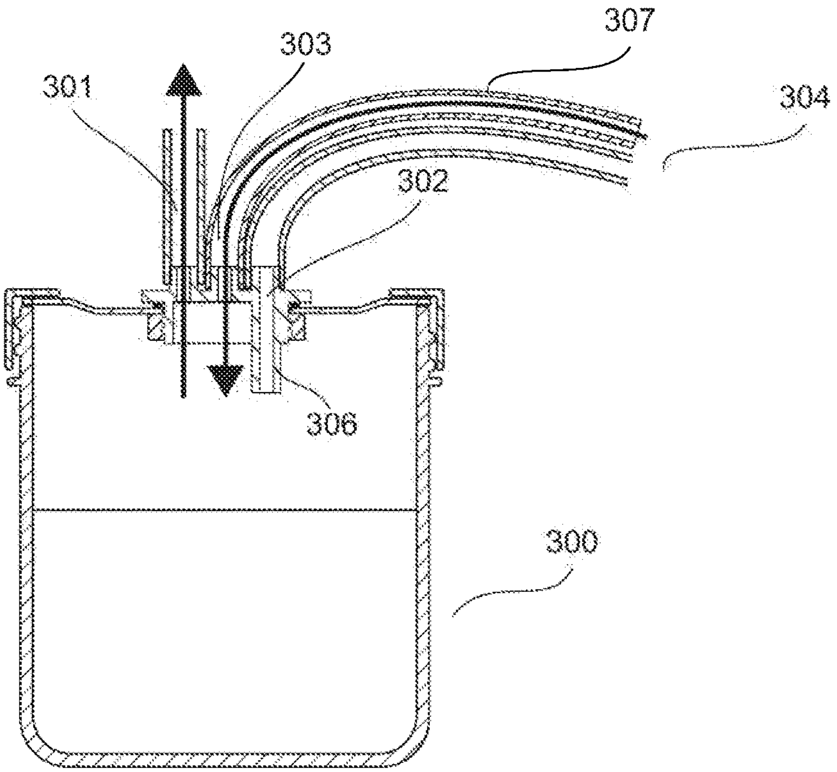
Figure 14B:
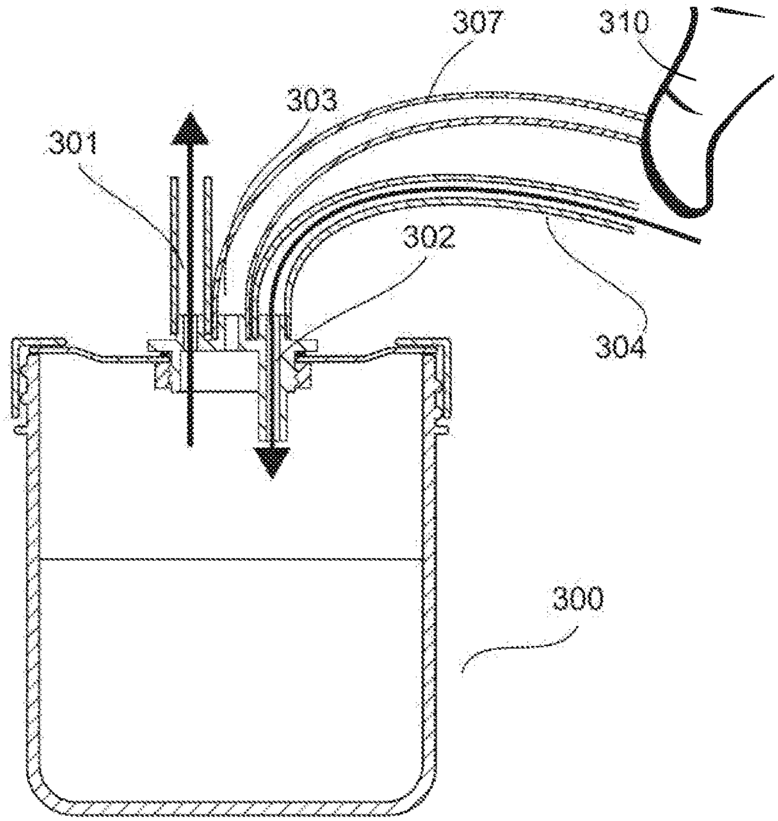
Figure 14C:
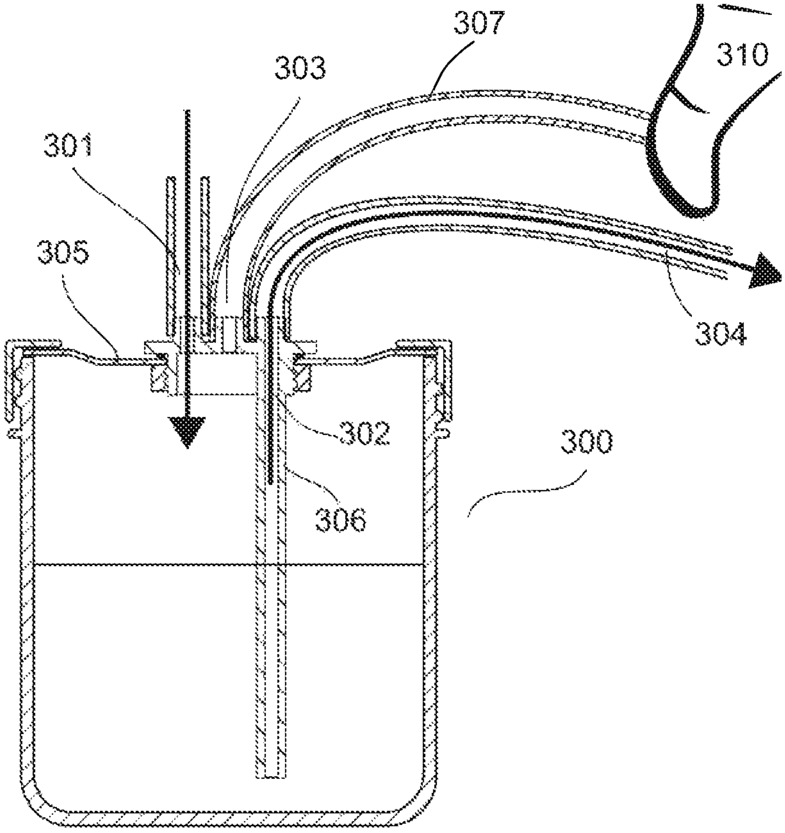
Figure 15:
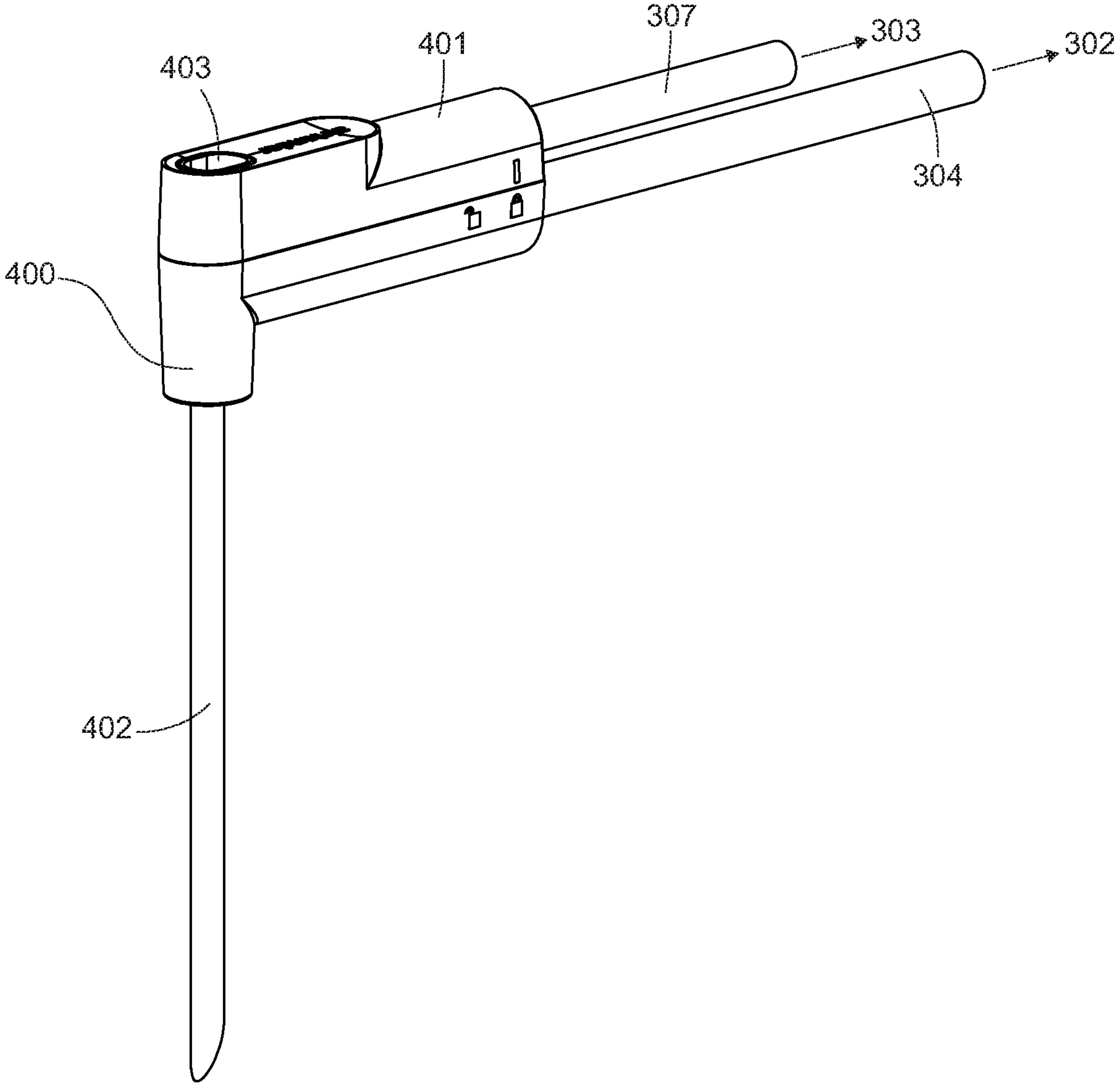
Figure 16A:
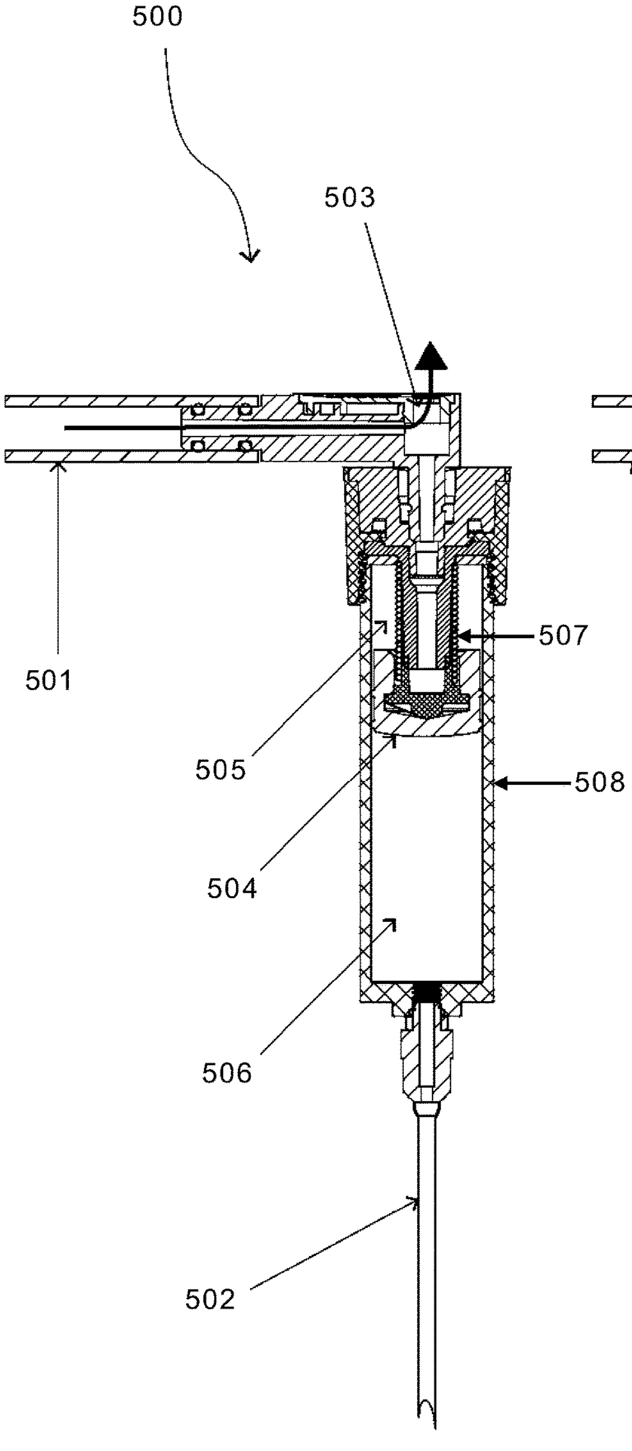
Figure 16B:
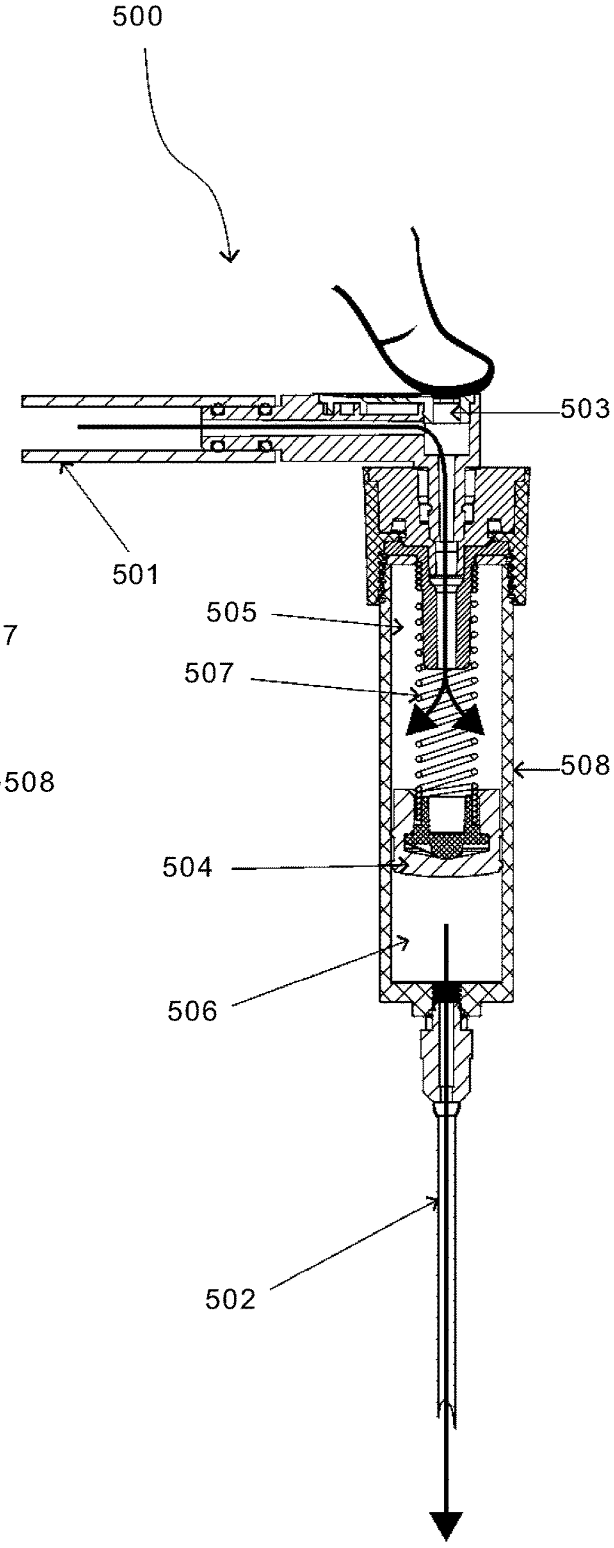

The present invention will be further elucidated with reference to a drawing comprising figures of exemplary embodiments. In the drawing shows:

FIG. 1 a schematic presentation of a pump system for an apparatus according to the invention;

FIG. 2 a schematic presentation of the pump system of FIG. 1 in the first mode;

FIG. 3 a schematic presentation of the pump system of FIG. 1 in the second mode;

FIG. 4 a schematic presentation of the pump system of FIG. 1 in the third mode;

FIG. 5 a schematic exploded view of an embodiment of a pump system for an apparatus according to the invention;

FIG. 6 a schematic exploded view of an embodiment of a support with a locking guide;

FIG. 7 a view of the side of the support containing the recesses for forming the channels;

FIG. 8 a schematic exploded view of an embodiment of an apparatus according to the invention;

FIG. 9 a schematic exploded view of an embodiment of a resilient support of the pump of the pump system;

FIG. 10 a schematic view of an embodiment of a moisture detection element with an internal reservoir for use in the pump system;

FIG. 11 a schematic view of another embodiment of an internal reservoir for use in the pump system;

FIGS. 12*a*, 12*b*, 12*c* a schematic representation of a moisture detection element in combination with an internal reservoir;

FIG. 13 a schematic view of an embodiment of a moisture external container for connection to the apparatus;

FIGS. 14*a*, 14*b*, 14*c* a schematic view of a second embodiment of a moisture external container for connection to the apparatus;

FIG. 15 a schematic view of an embodiment of a fluid injector for use with the external container of FIG. 14;

FIGS. 16*a*, 16*b* a schematic view of an alternative embodiment of a fluid injector for connection to the apparatus.

It is noted that in the figures corresponding elements are designated with corresponding reference signs. The figures are not to scale.

FIG. 1 gives a schematic representation of a pump system 100 for use in a kitchen appliance apparatus for using air in the kitchen. The pump system 100 comprises a single direction air pump 101 having an inlet 102 and an outlet 103. The pump system 100 further comprises a first three-way valve 104 and a second three-way valve 105. The first three-way valve 104 is fluidly connected to the inlet 102 of the pump 101. The second three-way valve 105 is fluidly connected to the outlet 103 of the pump 101. Further, the pump system 100 comprises a primary port 106 and a secondary port 107. The primary port 106 is fluidly connected with the first three-way valve 104 and the secondary port 107 is fluidly connected with the second three-way valve 105. Between the primary port 106 and a first arm 104*a* of the first three-way valve 104, a channel 108 is provided to establish the fluid connection, referred to as the primary port channel 108. Between the secondary port 107 and the first arm 105*a* of the second three-way valve 105, a channel 109 is provided to establish the fluid connection, referred to as the primary port channel 109.

A second arm 104*b* of the first three-way valve 104 is via a channel 110, referred to as the first inlet channel 110, fluidly connected to the inlet 102 of the pump 101. A second arm 105*b* of the first three-way valve 105 is via a second inlet channel 111 fluidly connected to the inlet 102 of the pump 101. A third arm 104*c* of the first three-way valve 104 is via a channel 112, referred to as a first outlet channel 112, fluidly connected to the outlet 103 of the pump 101. A third arm 105*c* of the second three-way valve 105 is via a channel 113, referred to as a second outlet channel 113, fluidly connected to the outlet 103 of the pump 101. So, the first three-way valve 104 is fluidly connected to the primary port 106, the inlet 102 of the pump 101, and the outlet 103 of the pump 101. The second three way-valve 105 is fluidly connected with the secondary port 107, the inlet 102 of the pump 101 and the outlet 103 of the pump 101. By providing this configuration, it is possible to have a pump system 100 that can operate bi-directionally, while still using a cost-effective single direction air pump 101, and without using two air pumps or a more complex bi-directional air pump. Depending on the opening and/or closing of one or more arms of the three-way valve, air can be pumped from the primary port to the secondary port or vice versa or even in an alternating mode. Thus, a bi-directional operable pump system 100 can be obtained with relatively few components and in a relatively simple set-up, which can keep the pump system 100 relatively cost effective while efficient in operation. Advantageously, the pump system 100 is provided inside of a housing of the kitchen appliance apparatus, wherein the primary port 106 and the secondary port 107 can be the connection with the environment outside of the housing.

FIG. 2 shows the pump system 100 operational in a first mode. In the first mode of the pump system 100, air is being pumped through the pump system from the primary port 106 to the secondary port 107. The primary port 106 can be connected to an accessory, such as a bag or a jar or a food storage box, etc. Then, air can be sucked out of the accessory to create an negative pressure. The secondary port 107 is in fluid connection with the environment outside of the pump system, in particular outside of the housing. To allow the air to pass through the pump system 100 from the primary port 106 to the secondary port 107, the first arm 104*a* and the second arm 104*b* of the first three-way valve 104 are open and the third arm 104*c* of the first three-way valve 104 is closed. In the second three way-valve 105, the first arm 105*a* and the third arm 105*c* are open, while the second arm 105*b* is closed. In this first mode, the air can be sucked into the pump system 100 via the primary port 106, the first three-way valve 104, the pump 101, the second three way-valve 105 to the secondary port 107. The primary port 106 thus may serve as an inlet to the pump system 100, and the secondary port 107 may serve as an outlet to the pump system 100 in the first operational mode. When the primary port 106 is coupled to an accessory such as a bag or a food container, air can be sucked out of the accessory, e.g. the bag or the container, and a negative pressure, a so-called vacuum, can be created in the accessory.

In the second operational mode, shown in FIG. 3, the first arm 104*a* and the third arm 104*c* of the first three-way valve 104 is open, while the second arm 104*b* is closed. In the second three-way valve, the first arm 105*a* and the second arm 105*b* is open, while the third arm 105*c* is closed. As such, air can be pumped through the pump system 100 from the secondary port 107 to the primary port 106. The secondary port 107 then serves as an inlet to the pump system 100, and the primary port 106 then serves as an outlet to the pump system 100. In the second mode, air can be sucked into the pump system 100 via the secondary port 107 to the second three-way valve 105 via the pump 101 to the first three-way valve to be blown out via the primary port 106. When the primary port 106 is coupled to an accessory, air can be blown into the accessory, e.g. for aerating or making foam etc.

FIG. 4 shows a scheme of the third operational mode, which is an alternating mode in which the pump system 100 switches between the first 'sucking' mode and the second 'blowing' mode. The three-way valves 104 and 105, and in particular the respective second arms 104*b*, 105*b* and the third arms 104*c*, 105*c* thus switch between an open condition and a closed condition. Switching between the first mode and the second mode typically is done rather frequently, at predetermined time intervals, e.g. every 1 second, or every 0.10 second or any other suitable time interval that provides for reaching a specified level of negative pressure. The pump system 100 further may comprise additional components, as schematically indicated in the schemes of FIGS. 2, 3, 4. For example, there is provided for particle filters 120, 121 in the primary port channel 108 and the secondary port channel 109 respectively. The particle filter 120, 121 may prevent particles, such as dust, sand or other dirt from entering into the pump system 100 and damaging the valves 104, 105 and/or the pump 101. Further, a pressure relief valve 122 can be provided, e.g. in the primary port channel 108 to prevent an overpressure in the pump system 100.

Also, various moisture protective measures can be provided in the pump system 100 to detect whether moisture is present in the air that is passing through the pump system 100 and/or to prevent moisture from passing through the valves and/or the pump, since moisture can potentially harm a pressure sensor 130, the valves 104, 105 and/or the pump 101 as well. Moisture may potentially be damaging to any electronic components that may be present in the apparatus comprising the pump system 100. As a protective measure, a protective film 123 can be provided upstream of the pump 101, preferably in the primary port channel 108. Such a protective film 123 can be arranged to allow air to pass through, but preventing fluid or moisture droplets to pass through. For example, when accidently sucking in fluid via the primary port 106, this fluid is then prevented from further entering the pump system 100 via the protective film 123. It may also be considered to provide a protective film in the secondary port channel 109 to prevent moisture sucked in with the air via the secondary port 107, e.g. in the second operational mode, to reach the valves 105, 104 and/or the pump 101. When the liquid or moisture is blocked by the protective film 123, the protective film can be blown clean when the pump is in the second operational mode, thus blowing the moisture away from the film towards the primary port 106 that serves as outlet in the second operational mode of the pump system 100.

An other moisture detection element may be a fluid sensor 124 provided upstream of the pump 101, for example in the primary port channel 108 and/or in the secondary port channel 109. Such a fluid sensor 124 may for example be embodied as two electrical contact points at a distance from each other in the channel. As soon as moisture is flowing through the channel, the two contact points are being brought in electrical contact, so an electrical voltage drop can be detected, indicating that moisture is detected in the channel. As an other moisture detection element, a moisture absorbing material may be placed upstream of the pump 101, for example in the primary port channel 108 and/or in the secondary port channel 109. The moisture absorbing material may be positioned translatable in a bypass chamber in the pump system 108, allowing air to pass along the material via the bypasses when the pump system 100 is operating in the first mode, and forcing air to pass through the material when the pump system is in the second mode. When the pump system is in the second mode, the material can be translated towards a shoulder of the chamber in which it is placed thus closing the bypasses and forcing the air to pass through the material. As such, any moisture captured or absorbed in the material, can be blown out of the material when the pump is operating in the second mode, thus providing for self-cleaning of the moisture absorbing material. Another protective measure for moisture, may be to provide a fluid internal reservoir 125 upstream of the pump 101, preferably in the primary port channel 108. Any moisture or liquid that passes through the primary port channel 108 is then collected in the fluid internal reservoir. When the fluid internal reservoir is filled, it may be emptied by a user. Such a fluid internal reservoir 125 may prevent that liquid that is, accidently or not, sucked via the primary port 106 reaches the valves 104, 105 and/or the pump 101. It is noted that various measures for moisture detection can be combined, as well as can be positioned elsewhere in the pump system, e.g. in the secondary port channel etc.

Advantageously, the pressure sensor 130 is provided to the primary port channel 108, so the actual pressure in the primary port channel 108 can be measured. For example, when the pump system 100 is operating in the first mode, it can be measured whether the required negative pressure is already achieved. Or, when the pump system 100 is operating in the second blowing mode, it can be measured whether an positive pressure is obtained. By providing such a pressure sensor 130, the functioning of the pump 101 and/or of the pump system 100 can be monitored.

In FIG. 5 a possible arrangement of the valves 104, 105 is shown. The three-way valves 104, 105 are embodied as three-way solenoid valves 104, 105 that are indirectly connectable to a printed circuit board 200. The solenoid valves 104, 105 are mounted, via conventional mounting elements such as screws 201, to a support 202. At one side 202*a*, the support 202 is configured to receive the solenoid valves 104, 105 with seats 203 for connecting the solenoid valves 104, 105. Tubular pillars 212 are provided around which hoses can be received. In the pump system, the fluid connections are advantageously established by hoses, such as hoses 207. These hoses 207, or at least some of them, can be connected to the support 202. To that end, the support 202 is provided at one side 202*a* with the hose receiving elements 212, embodied as tubular pillars. At another side 202*b* of the support 202, shown in FIG. 7, the support 202 is provided with recesses 204. The recesses 204 provide for a fluid connection between the valves 104, 105 and the pump 101. As such, the support 202, in particular, the side 202*b* of the support 202 serves as a manifold fluidly connecting the valves and the pump of the pump system. The recesses 204 are closed by the printed circuit board 200 to form one of the channels 110, 111, 112, 113. Between the printed circuit board 200 and the side 202*b* of the support 202, a sealing element 205 is provided to sealingly close the recesses 204. The support 202 is connected to the printed circuit board 200 with conventional fastening elements, such as screws 206, passing through the sealing element 205. The channels fluidly connecting the valves 104, 105 to either the primary port 106 or the secondary port 107 or the pump 101 are embodied as hoses 207. Further, in the manifold 202*b*, a recess 208 is provided in which a membrane 209 can be placed, thus providing for the pressure sensor 130. At the position of pressure sensor, there is an opening 210 in the sealing element 205 as not to tamper the functioning of the pressure sensor. On the printed circuit board 200, an area 211 is dedicated to receive the support 202 with the valves 104, 105.

FIG. 6 shows a locking guide 213 that can be used to guide and tighten a number of hoses 207 forming the fluid connections of the pump system towards their associated hose receiving elements 212 on one side 202*a* of the support 202. The locking guide 213 itself is also provided with a number of pillars 214 through which a hose 207 can be guided. A single hose 207 is guided through two guide pillars 214 such that both ends of the hose 207 are at one side of the locking guide 213, preferably the side facing the support 202. By bringing the locking guide 213 towards the support 202 by tightening the screws 206, the ends of the hoses 207 guided through the pillars 214 are brought towards their associated hose receiving elements 212 for a fluid tight coupling. As such, an efficient and compact hose connection and hose arrangement inside of the housing is obtained that can relatively easy be assembled.

FIG. 8 shows an exploded view of an embodiment of an apparatus 1 according to the invention. The apparatus 1 comprises a pump system 100 as shown in the FIGS. 1-7 that is arranged in a housing 2. The housing 2 here comprises multiple parts, a bottom part 2*a*, a wall part 2*b* and a top part 2*c*. The bottom part 2*a* forms the base, while the top part 2*c* comprises a user contact area 4*a* of the user interface 4. The printed circuit board 200, not visible, with the sealing member 201 and the support 202 of the valves 104, 105 is mounted upside down in the housing with the valves facing downwardly. As such, the other side of the printed circuit board can be used to connect the electronic components 4*b* of the user interface 4 to. Thus, a relatively compact and concise apparatus 1 can be obtained, in which the space available in the housing 2 is used as efficiently as possible.

As can be seen as well in FIG. 9, the pump 101 is mounted resiliently to the housing 2. In particular, the pump 101 is connected to a pump frame 5 using a spring connection 6. The spring connection 6 can be embodied as a plate spring encompassing the pump 101. Also, the pump frame 5 is resiliently mounted to the housing 2, in particular to the bottom part 2*a*. Thereto, the fastening elements 7, here conventional screws, that connect the pump frame 5 with the bottom part 2*a* are received in resilient busses 8. The resilient busses 8 are provided with protrusions 9, e.g. ribs or flanges, that can rest onto a shoulder 16 of the pump frame 5. As such, vibrations of the pump 101 may not or only limitedly be transmitted to the housing 2, in particular to the bottom part 2*a*. Also the printed circuit board 200 with the valves 104, 105 and other electronic components can remain substantially free of vibrations induced by the pump 101. Thus, the lifetime of the housing, but also of the electronic components may be increased, as well as that during use, the apparatus can substantially remain in position, instead of starting to move due to the vibrations. This is more convenient for the user. A hose 10 that can be used to couple to an accessory can be rolled up around the bottom part 2*a* of the housing 2, and can thus be stored inside of or around the housing 2 when not in use. The hose 10 is flexible and can be rolled out when in use, or rolled up for storage.

The primary port 106 and the secondary port 107 of the pump system 100 can be provided in the housing 2, and may thus form a connection with the environment outside of the housing. Further, the primary port 106 is also arranged to provide for a coupling with an accessory, such as a bag or a food container or a tray or a bowl or a jar etc. while the secondary port 107 is arranged for fluid connection with the outside environment to blow out air to the outside or the suck in air from the outside environment, outside of the housing 2.

FIG. 10 shows an embodiment in which some of the measures for moisture detection are shown, such as the internal reservoir 125, the fluid sensor 124. Further, the hose forming the primary port channel 108 is also partly shown. The primary port 106 is here engageable to the hose 10, wherein the end 11 of the hose 10 is provided with a coupling element 12 for coupling with an accessory. The coupling element 12 can for example simply be placed on an opening in an accessory, or may be placed in a corresponding recess of an accessory etc. Many variants are possible. In the coupling element 12, or between the coupling element 12 and the hose 10, a filter 120 can be provided as well. Further, a ring 13, fastening element 14 and bus 15 are provided that connect the coupling element 12 with the end 11 of the hose 10. Removing of the coupling element 12 from the end 11 of the hose 10 may give access to the filter 120, if present, and/or to a moisture absorbing material, if present. As such, a filter and/or a moisture absorbing material can be replaced if required.

FIG. 11 shows an alternative embodiment of an internal fluid reservoir 125. The internal fluid reservoir 125 is at one side coupled to the hose 10 having the coupling element 12 for coupling to an accessory at its end. The fluid reservoir 125 is at another side coupled to a hose 108. The fluid reservoir 125 is during use stored internally inside of the housing 2. The fluid reservoir 125 is used in combination with a moisture detection element 124. The functioning of the moisture detection element 124 is explained in relation to FIG. 12. The size of the fluid reservoir 125 is constrained by the available space in the housing, but is preferably as large as twice the volume that can be pumped in a time interval between detection of the moisture and, preferably automatic, stopping of the pump motor. Advantageously, when the moisture detection element 124 detects moisture, it sends a detection signal to the control unit that then instructs the pump to stop functioning. Upon stopping of the motor, the user can remove the internal reservoir 125 from the housing and can empty the reservoir 125. Here, the reservoir 125 can be inserted into a chamber 126 in the housing. The chamber 126 is accessible from the outside by the user, such that the user can remove the reservoir 125 from the chamber 126. To allow removal of the reservoir 125 outside of the housing, the flexible hose 108 and the hose 10 are arranged to move along with the reservoir 125. The reservoir 125 is provided with a lid 127 that can be removed from the reservoir 125. After removal of the lid 127, the reservoir 125 can be emptied and cleaned when necessary. After emptying of the reservoir 125 it can be placed back into the chamber 126. The hose 108 can be put back into a groove 128 in a wall of the housing. The moisture detection element 124 is here provided as a plate like element 130 with two electrical contact areas 131. The plate like element 130 is further provided with electric wiring, not shown, providing for the electrical connection with the printed circuit board, and, preferably the control unit. When there is moisture on one or both of the electrical contact areas 131, there is a voltage drop. Due to the voltage drop, the control unit recognizes that moisture is detected and the control unit can then send a signal to the pump to stop operating. The plate like element 130 can be inserted through a slit in the reservoir 125 and through a slit in the housing wall 2. The plate like element 130 has a U-shaped end. On each leg of the U-shape an electrical contact area 131 is provided. The electrical contact areas 131 are in contact with a moisture sensor in the reservoir 125. At the same time, the U-shape provides for a form-locking of the reservoir 125 to the housing 2 thus preventing accidental removing of the reservoir 125 from the housing 2. It is after removal of the plate like element 130, that the form locking is undone and the reservoir 125 can be taken out of the housing 2 for emptying. Advantageously, when the reservoir 125 is removed from the housing 2, the user can be prevented from pushing the plate like element 130 back into the housing 2. Preferably, the container 125 unlocks a retaining mechanism for retaining the plate like element 130 in place, so that the plate like element 130 preferably can only be inserted back into the housing 2 when the reservoir 125 is also in the housing 2.

FIGS. 13, 14*a*, 14*b*, 14*c* and 15 give an example of a fluid external container 300 that is to be positioned outside of the apparatus, and to be fluidly connected to the primary port 106 of the apparatus. The fluid external container 300 can be used as a moisture detection element or as a moisture receptacle. In the embodiment shown in FIG. 13, the fluid external container 300 comprises a first opening 301 that is fluidly connectable to the primary port 106 and a second opening 302 that is fluidly connectable with a further element, such as an accessory. The external container 300 is closed air-tightly with a cover 305. In this embodiment, by using the fluid external container 300, the apparatus can also be used for sucking up liquid, e.g. spoiled liquid, or superfluous liquid during cooking etc. Then the second opening 302 can be connected to a hose 304, the end of which can be used to drain liquid. The pump system of the apparatus thereto needs to be operated in the first 'sucking' mode, such that air can be pumped through the system from the primary port 106 towards the secondary port 107. When sucking in air via the primary port 106, due to the air-tight closing of the external container 300 with the cover 305, a sufficient negative pressure can be created, such that air and/or liquid can be sucked up with the end of the hose 304. The liquid, or moisture contained in the air, falls down in the receptacle 300 and is then received in the receptacle 300. To avoid contamination between the second opening 302 and the first opening 301, e.g. to avoid that accidently liquid and/or moisture enters the first opening 301, the second opening 302 is provided as a tube 306 that extends lower into the receptacle 300 than the first opening 301. Such liquid receiving external container 300 can be used instead of or in addition to the measures for moisture detection provided in the apparatus, as explained above.

In a further embodiment of the external container 300, shown in FIGS. 14*a*, 14*b* and 14*c*, a third opening 303 is provided that can be opened or closed. The third opening 303 is here provided with a hose 307, the end of the hose 307 can be opened or closed by a finger, as shown in FIG. 14*b*. Alternatively, a liquid injector 400 shown in FIG. 15 can be coupled to the second opening 302 and the third opening 303.

In the embodiment shown in FIGS. 14*a*, 14*b*, 14*c*, the external container 300 can also be used to dispense liquid out of the external container 300. The first opening 301 is fluidly connected with the primary port 106 of the apparatus 1. With the pump system in the first mode, air is being sucked from the primary port 106 through the system towards the secondary port 107. Since the first opening 301 is connected to the primary port 106, air is being sucked through the first opening 301 as well. When both the second opening 302 and the third opening 303 is open, as shown in FIG. 14*a*, the second and the third opening may both serve as entry openings to the external container 300 via which air and/or liquid can be sucked up simultaneously. Then, the use of only hose 304 for sucking up liquid doesn't work as no negative pressure is created in the external container. However, when the third opening 303 is closed, e.g. by a finger 310, as shown in FIG. 14*b*, the functioning of the external container 300 connected to the apparatus, is the same as for the embodiment shown in FIG. 13, and liquid can be sucked up via the hose 304. The liquid falls down in the external container and remains in the external container 300. In FIG. 14*c*, the functioning of the external container 300 is shown with the pump system 100 in the second mode. Then, air is being blown out of the primary port 106 and is pumped from the secondary port towards the primary port of the pump system. Since the first opening 301 is fluidly connected to the primary port, air flows from the primary port via the first opening 301 into the external container 300. When then the third opening 303 is closed, e.g. by a finger at the end of the hose 307 that is connected to the third opening 303, a positive pressure is created in the external container 300. When the tube 306 of the second opening 302 is sufficiently long, preferably it extends until just above a bottom of the external container 300, then liquid contained in the external container 300 can be pushed out of the external container 300 through the tube 306 and the hose 304. This mode can for example be used to hydrate food during cooking.

The liquid injector 400 shown in FIG. 15 can be coupled to second opening 302 and the third opening 303 respectively via hoses 304 and 307. The hoses 304 and 307 end in an injector head 401 from which a hollow injector needle 402 extends. Similar as in FIG. 14*c*, the third opening 303 can be closed by a finger, here an opening 403 in the injector head is provided that is in fluid connection with the third opening 303. With the liquid injector 400 connected to the cover 305 of the external container 300 and the external container 300 connected to the primary port of the apparatus, the liquid injector 400 can be used for injection liquid contained in the receptacle 300 directly into food when the pump is operating in the second mode. The injector needle 402 can penetrate the food such that the liquid can be injected inside of the food. This can be advantageous for applying marinade to meat or to inject a sauce into pastry for example. Many uses are possible.

FIGS. 16*a*, 16*b* give an example of an accessory being here a fluid injector 500 for connection to the apparatus 1. The fluid injector 500 comprises a first opening 501 that is fluidly connectable to the primary opening 106. The first opening 501 fluidly connects to a third opening 503 and to a piston chamber 508. The piston chamber 508 comprises a piston 504 which divides the piston chamber 508 into a first chamber 505 and a second chamber 506. The first chamber 505 is fluidly connected to the first opening 501 and the third opening 503. The second chamber 506 is fluidly connected to the second opening 502 of the accessory, here the injector needle 502. The first chamber 505 comprises a resilient element 507, such as a spring 507, biased to pull the piston 504 towards a first position in which a piston chamber entrance fluidly is connected to the first opening 501 and the third opening 503. In the embodiment of FIGS. 16*a*, 16*b*, the first position is an upper position of the piston 504 in the piston chamber 508. In use, when the pump of the apparatus 1 is operating in the second mode, air is pumped from the primary opening 106 towards the first opening 501. The air pumped from the pump system 100 towards the first opening 501 travels towards the third opening 503 and the first chamber 505. If the third opening 503 is closed off, for example, as shown in FIG. 16*b* with a finger, the air is pumped into the piston chamber 508. The air pressure applied to the piston 504 becomes larger than the biasing force of the spring 507, causing the piston 504 to move towards the injector needle 502 towards a second position of the piston 504. In the embodiment of FIGS. 16*a*, 16*b*, the second position of the piston 504 is a more downward position. The user may then insert the injector needle 502 e.g. into food or liquid for example to insert fluid received in the second chamber 506 thereto. Or, the fluid received in the second chamber 506 may be distributed over food, e.g. to marinate. Alternatively, when the piston 504 is pushed towards the second position, upon releasing the air pressure, e.g. by releasing the opening 502, the piston 504 moves upward towards the first position again under influence of the spring biasing force, then, some fluid may be sucked up by the injector needle 502 and may be received in the second chamber 506. Opening the third opening 503 causes the air pressure in the first chamber 505 to lower, and the spring 507 pulls the piston 504 towards the piston chamber entrance fluidly connected to the first opening 501 and the third opening 503. This movement of the piston 504 in combination with the injector needle 502 being inserted into the food or liquid causes the pressure in the second chamber 506 to lower, which causes liquid from the food, or another receptacle in which the needle is inserted, to be sucked into the second chamber 506. In order to release the fluid now contained in the second chamber 506, the user can again close off the second opening 502 with e.g. a finger or another element. The air pressure in the first chamber 505 will increase again, causing the piston 504 to move towards the injector needle 508, thereby pushing the fluid contained in the second chamber 506 out through the injector needle 502.

The second chamber 506 of the fluid injector 500 can be seen as the equivalent of the external container 300 disclosed in FIGS. 13, 14*a*, 14*b* and 14*c*. Here, the external container is in fact integrated to the injector 500. In some aspects, the fluid injector 500 can be seen as a combination of the external container 300 of FIG. 14 and the injector needle 400 of FIG. 15.

Furthermore, it shall be appreciated that variants of the fluid injector 500 are possible. The spring 507 can for example be biased to push the piston 504 towards the injector needle 502, to the second position of the piston 504. In this case, the pump can operate in the first mode to provide a negative pressure in the first chamber 505 in order to counter the spring 507. The fluid injector 500 according to this embodiment further may operate in a comparable manner as the fluid injector 500, with the difference that closing off the third opening 503 results in the piston 504 moving away from the injector needle 502 instead of towards it.

The accessory 500 connected to the apparatus 1 may provide for a system according to an aspect of the invention. The accessory 400 and/or the container 300 connected to the apparatus 1 may provide for a system according to an aspect of the invention.

There is provided a kitchen appliance apparatus for using air in the kitchen, comprising a housing, wherein in the housing a pump system is provided which pump system comprises, a primary port, a secondary port, a single direction air pump having an inlet and an outlet; wherein the pump system is operational in a first pump mode in which air can be sucked in via the primary port; the pump system is operational in a second pump mode in which air can be blown out via the primary port; and is operational in a third pump mode in which the pump system is alternatingly sucking in and blowing air via the primary port.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. A kitchen appliance apparatus for using air in a kitchen, comprising a housing, wherein in the housing a pump system is provided, the pump system comprising:

a primary port;

a secondary port;

a single direction air pump having an inlet and an outlet;

a first three-way solenoid valve fluidly connected to the primary port, to the inlet of the pump, and to the outlet of the pump, a second three-way solenoid valve fluidly connected to the secondary port, to the inlet of the pump, and to the outlet of the pump;

wherein the primary port is arranged for connection with an accessory outside of the housing, wherein the secondary port is arranged for fluid connection with an environment outside of the housing;

wherein the pump system is operational in a first pump mode in which air can be sucked in via the primary port; the pump system is operational in a second pump mode in which air can be blown out via the primary port; and is operational in a third pump mode in which the pump system is alternatingly sucking in and blowing air via the primary port.

2. The apparatus according to claim 1, wherein each of the three-way solenoid valves are configured for being switched among the first pump mode, the second pump mode, and the third pump mode.

3. The apparatus according to claim 1, wherein the pump system further comprises a pressure sensor arranged in a channel connecting the primary port with the first three-way solenoid valve.

4. The apparatus according to claim 1, further comprising a protective film arranged in a channel connecting the primary port with the first three-way solenoid valve, wherein the protective film is arranged to allow air to pass through and prevent liquid from passing through.

5. The apparatus according to claim 1, further comprising a hose engageable to the primary port, wherein the hose at a free end thereof is arranged for connection to the accessory.

6. The apparatus according to claim 5, wherein the free end of the hose is provided with a coupling element for coupling with the accessory.

7. The apparatus according to claim 1, further comprising a printed circuit board to which the first three-way solenoid valve and the second three-way solenoid valve are connectable.

8. The apparatus according to claim 7, wherein the first three-way solenoid valve and the second three-way solenoid valve are mounted on a support, wherein the support comprises recesses for forming a channel connection with the first three-way solenoid valve, the second three-way solenoid valve, or the pump, wherein the support is mountable onto the printed circuit board with the recesses facing the printed circuit board for forming the channel connection.

9. The apparatus according to claim 8, wherein between the support and the printed circuit board the channel connection is sealed.

10. The apparatus according to claim 1, wherein one or more fluid connections between the first three-way solenoid valve and the primary port, between the first three-way solenoid valve and the inlet of the pump, between the first three-way solenoid valve and the outlet of the pump, between the second three-way solenoid valve and the secondary port, between the second three-way solenoid valve inlet of the pump, or between the second three-way solenoid valve and the outlet of the pump, are provided as flexible hoses arranged inside of the housing.

11. The apparatus according to claim 10, wherein a locking guide is provided through which at least one of the flexible hoses is guided.

12. The apparatus according to claim 11, wherein the first three-way solenoid valve and the second three-way solenoid valve are mounted on a support, wherein the support comprises recesses for forming a channel connection with the first three-way solenoid valve, the second three-way solenoid valve, or the pump, wherein the support is mountable onto the printed circuit board with the recesses facing the printed circuit board for forming the channel connection, and wherein the locking guide is arranged for locking to the support at a side opposite that at which the recesses are provided.

13. The apparatus according to claim 2, further comprising a control unit provided on a printed circuit board.

14. The apparatus according to claim 2, wherein the apparatus further is provided with a user interface that allows a user to operate a control unit.

15. The apparatus according to claim 1, wherein the pump is resiliently supported in the housing.

16. The apparatus according to claim 1, wherein the pump system comprises a moisture detection element for detecting moisture in a channel upstream of the pump.

17. The apparatus according to claim 16, wherein the moisture detection element is arranged upstream of the pump.

18. The apparatus according to claim 16, wherein the moisture detection element comprises a moisture absorbing material arranged upstream of the pump.

19. The apparatus according to claim 16, wherein the moisture detection element comprises two electrical contact points arranged at a distance from each other in the channel, such that when moisture is present the two electrical contact points are brought in electrical contact to detect the moisture.

20. The apparatus according to claim 16, wherein the moisture detection element comprises an internal reservoir fluidly connected to the channel to receive moisture or fluid that enters the primary port.

* * * * *